(12) United States Patent
Panda et al.

(10) Patent No.: US 11,586,488 B2
(45) Date of Patent: Feb. 21, 2023

(54) RETURN AND REPLACEMENT PROTOCOL (RRP)

(71) Applicant: Cisco Technology, Inc., San Jose, CA (US)

(72) Inventors: Kailash Chandra Panda, Odisha (IN); Samir Kumar Patro, Bangalore (IN); Pon Murugesh P, Tamil Nadu (IN); Guru Prasanna Prusty, Karnataka (IN); Varun Mahajan, Bangalore (IN); Sumit Kumar Gupta, Karnataka (IN)

(73) Assignee: Cisco Technology, Inc., San Jose, CA (US)

( * ) Notice: Subject to any disclaimer, the term of this patent is extended or adjusted under 35 U.S.C. 154(b) by 700 days.

(21) Appl. No.: 16/544,319

(22) Filed: Aug. 19, 2019

(65) Prior Publication Data
US 2020/0159603 A1 May 21, 2020

Related U.S. Application Data

(60) Provisional application No. 62/770,683, filed on Nov. 21, 2018.

(51) Int. Cl.
*G06F 11/07* (2006.01)
*H04L 41/06* (2022.01)
(Continued)

(52) U.S. Cl.
CPC ........ *G06F 11/079* (2013.01); *G06F 11/0709* (2013.01); *G06N 3/08* (2013.01);
(Continued)

(58) Field of Classification Search
CPC ....... H04L 41/06; H04L 12/18; H04L 69/329; H04L 36/0892; G06F 11/079; G06F 9/4406; G06N 3/08; H06N 20/10
See application file for complete search history.

(56) References Cited

U.S. PATENT DOCUMENTS 7,151,884 B1 * 12/2006 Rayes ................. H04L 41/0803
370/254
7,693,048 B1  4/2010 O'Riordan
(Continued)

FOREIGN PATENT DOCUMENTS

JP  2017183969  10/2017
WO  2016175877  11/2016

*Primary Examiner* — Brenda H Pham
(74) *Attorney, Agent, or Firm* — Polsinelli

(57) ABSTRACT

Systems and methods provide for managing faulting network devices. A first network device can receive an error. The first network device can generate one or more frames including data indicative of the error. The first network device can broadcast the one or more frames to one or more neighboring network devices. It may be determined that the first network device is inaccessible. The first data can be retrieved and presented from a second network device among the one or more neighboring network devices. In some embodiments, a network management system can utilize the first data to generate a machine learning model that classifies whether network devices are instances of network devices designated for a Return Merchandise Authorization (RMA) process. In some embodiments, the network management system can apply the first data to a machine learning classifier to determine whether to initiate the RMA process for the first network device.

17 Claims, 13 Drawing Sheets

(51) Int. Cl.
    *H04L 12/18*      (2006.01)
    *H04L 69/329*     (2022.01)
    *G06N 3/08*       (2023.01)
    *G06N 20/10*      (2019.01)
    *G06Q 30/016*     (2023.01)
    *G06F 9/4401*     (2018.01)
    *H04L 9/40*       (2022.01)

(52) U.S. Cl.
    CPC ............ *G06N 20/10* (2019.01); *G06Q 30/016* (2013.01); *H04L 12/18* (2013.01); *H04L 41/06* (2013.01); *H04L 69/329* (2013.01); *G06F 9/4406* (2013.01); *H04L 63/0892* (2013.01)

(56) References Cited

U.S. PATENT DOCUMENTS

| | | |
|---|---|---|
| 9,634,961 B2 | 4/2017 | McCaughan et al. |
| 2009/0052328 A1 | 2/2009 | Rentschler et al. |

* cited by examiner

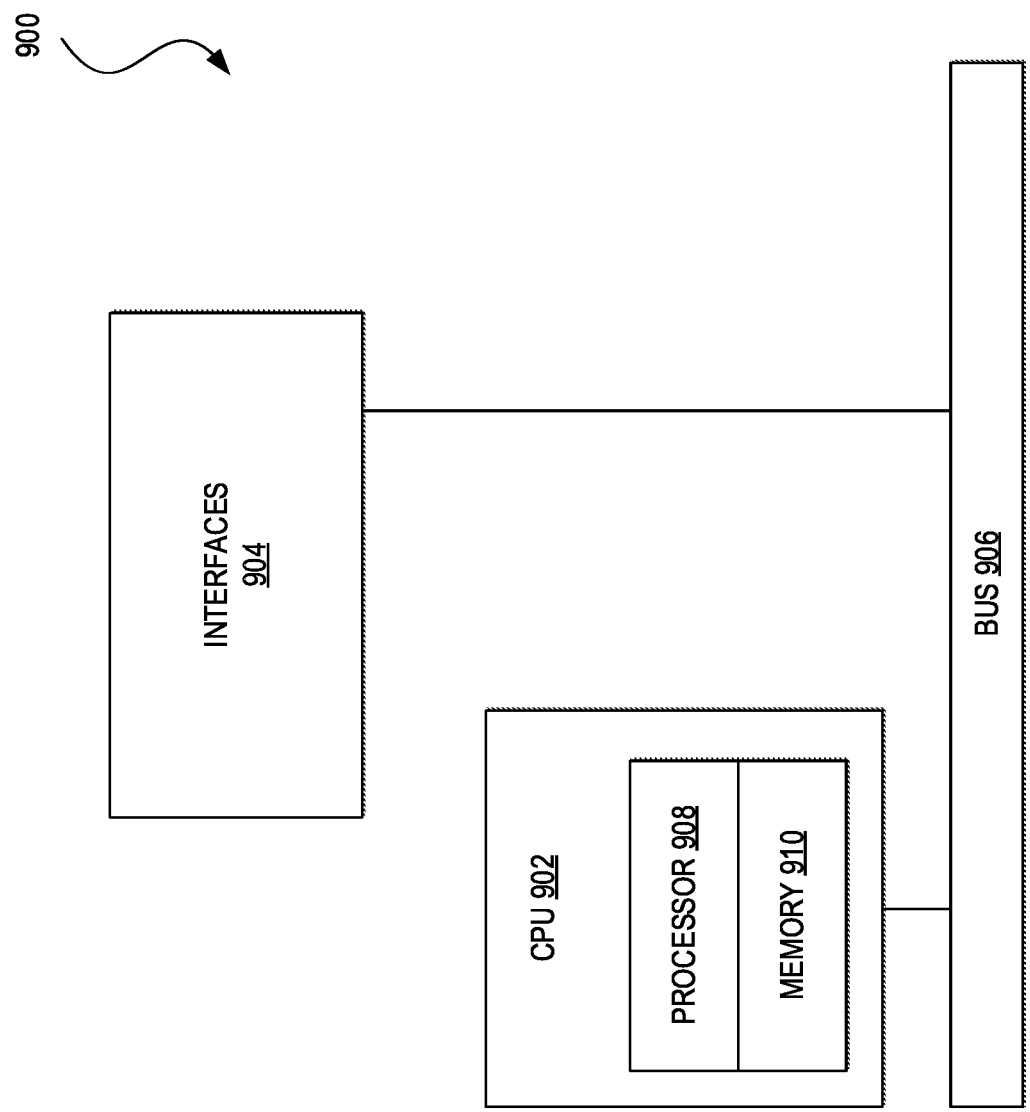

RETURN AND REPLACEMENT PROTOCOL (RRP)

CROSS-REFERENCE TO RELATED APPLICATIONS

This application claims priority to U.S. Provisional Patent Application No. 62/770,683, filed on Nov. 21, 2018, the content of which is incorporated herein by reference in its entirety.

TECHNICAL FIELD

The subject matter of this disclosure relates in general to the field of computer networking, and more particularly, to systems and methods for managing Return Merchandise Authorization (RMA) for a network device.

BACKGROUND

A network device (e.g., switch, router, etc.) may fault from time to time for any number of reasons. A network operator may be required to send out a technician at a cost of time, expense, and effort to diagnose the fault. However, it can be difficult to troubleshoot the fault if the device is unresponsive, crashed or crashing, and/or continuously rebooting because diagnostic information is lost or inaccessible when the device is down, crashed or crashing, and/or indefinitely rebooting. In these instances, the network operator may be required to send the device back to the manufacturer for further debugging at significant cost of time, expense, and effort for the manufacturer. Thus, improvements are needed for managing faulting network devices to ensure continuous network service for end users and limiting costs of time, expense, and effort to network operators and network device manufacturers for troubleshooting faulting network devices.

BRIEF DESCRIPTION OF THE FIGURES

To provide a more complete understanding of the present disclosure and features and advantages thereof, reference is made to the following description, taken in conjunction with the accompanying drawings, in which:

FIG. 9 illustrates an example of a network device in accordance with an embodiment.

DESCRIPTION OF EXAMPLE EMBODIMENTS

Figure 1:
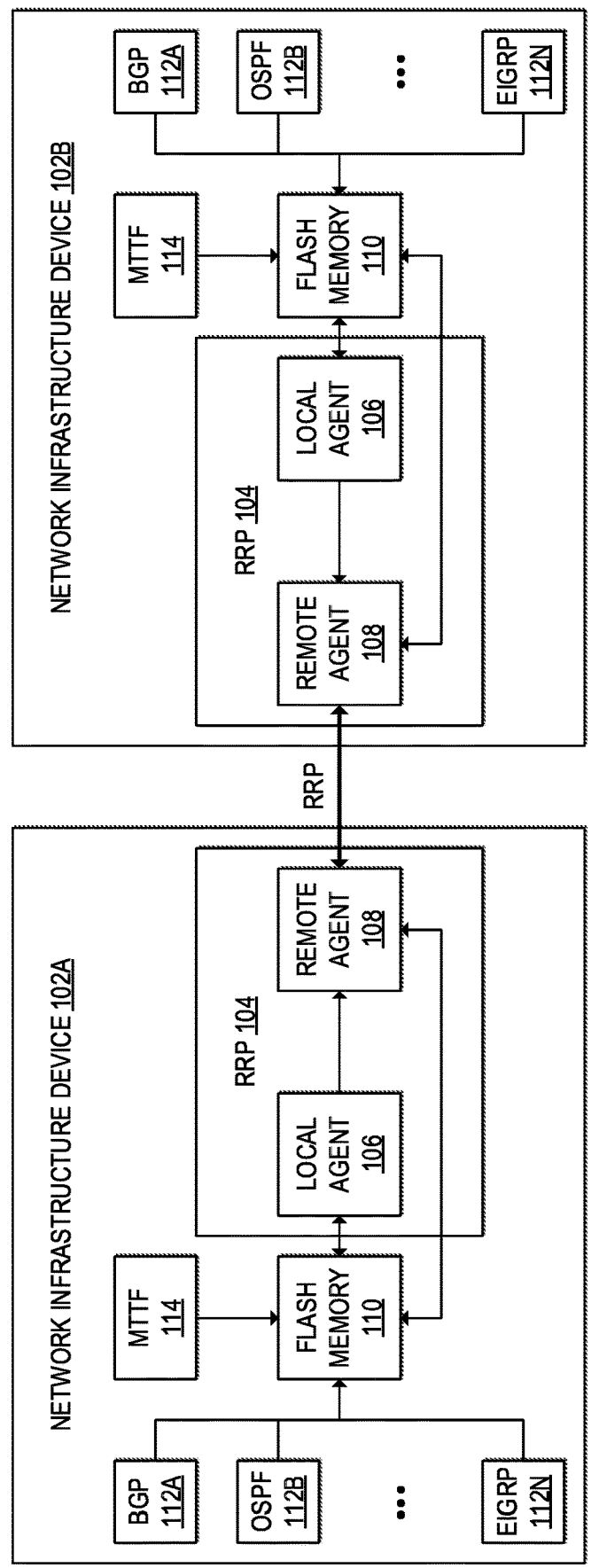
FIG. 1 illustrates an example of a communication framework for Return and Replacement Protocol (RRP) in accordance with an embodiment.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

A network device (e.g., switch, router, network appliance, etc.) may fault from time to time and require troubleshooting. If the fault causes the network device to crash before the network device can save information relating to the crash, diagnostic information may not be available to a network operator for debugging the device. In addition, if the fault causes the network device to continuously crash/reboot (e.g., an endless reboot loop), the device may be inaccessible. Under these circumstances, a network operator may be required to manually initiate a Return Merchandise Authorization (RMA) process and return the network device to the manufacturer. However, it can also be difficult for the manufacturer to debug the device without additional contextual information. Meanwhile, service to end users may be detrimentally affected when the network device must be replaced.

Various embodiments of the present disclosure can overcome the deficiencies of prior art approaches for managing faulting devices by using Return and Replacement Protocol (RRP). For example, a network device that implements RRP can propagate crash/error data and other diagnostic data to neighboring devices such that this diagnostic data is available for troubleshooting even when a network device crashes/reboots endlessly. The network device can run one or more light-weight daemons to monitor a health state of the network device as well as significant health events (e.g., errors previously causing network devices to be designated for RMA, errors satisfying a criticality threshold, crashes, etc.) of directly connected devices. The daemon(s) can collect, process, and store its own health state information and broadcast this information to neighboring devices. This data can be used to troubleshoot the network device when it faults.

In addition, RRP data can be used to define models for automatically determining when a network device has to be replaced (e.g., marked for a Return Merchandise Authorization (RMA) process). In some instances, the models may be capable of predicting when a device must be designated for RMA, and a network operator can plan for replacement so as to minimize disruption to the network.

Systems and methods provide for managing faulting network devices. A first network device can receive a system event message indicative of a first error. The first network device can generate one or more first frames including first data indicative of the first error. The first network device can broadcast the one or more first frames to one or more neighboring network devices. It may be determined that the first network device is inaccessible. The first data can be retrieved and presented in response to a request from a second network device among the one or more neighboring network devices. In some embodiments, a network management system can utilize the first data to generate a machine learning model that classifies whether network devices are instances of network devices designated for a Return Merchandise Authorization (RMA) process. In some embodiments, the network management system can apply the first data to a machine learning classifier to determine whether to initiate the RMA process for the first network device.

Example Embodiments

FIG. 1 illustrates an example of a communication framework 100 for Return and Replacement Protocol (RRP). One of ordinary skill in the art will understand that, for the communication framework 100 and any other system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure.

In this example, the communication framework 100 includes a pair of network devices 102A and 102B (collectively, 102), such as a switch, router, access point, wireless local area network (WLAN) controller, network appliance (e.g., network address translator (NAT), firewall, distributed denial of service (DDoS) mitigator, load balancer, intrusion prevent system (IPSs), intrusion detection systems (IDS), wide area network (WAN) optimizer, network management system, and so forth. Each network device 102 can include an RRP module 104. The RRP module 104 can include a local agent 106 and a remote agent 108. The local agent 106 can collect, process, and store failure parameters relevant to the network device 102, such as in flash memory 110 or other suitable storage medium. For example, the local agent 106 can process instances when the network device 102 fails or crashes and convert these events to error signatures for transmission to the remote agent 108. The remote agent 108 can broadcast the error signatures to neighboring network devices. In some embodiments, the RRP agent 104 may be capable of intelligently processing the error signatures, and broadcasting a log of the most critical events or crashes to neighboring devices.

In some embodiments, RRP can be implemented as a one-hop protocol with periodic transmissions at specified intervals (e.g., 30 seconds by default but can be configurable on an individual device, such as via a command line interface (CLI), or multiple devices (including network-wide), such as via a network management system as discussed further below with respect to FIG. 4). The remote agent 108 may broadcast RRP messages to directly connected interfaces. In some embodiments, RRP can operate at the data link layer or Layer 2 of the Open Systems Interconnection (OSI) network model such that two or more network devices that support different network layer or Layer 3 protocols (e.g., Internet Protocol (IP), Internetwork Packet Exchange (IPX), etc.) can share RRP messages. However, RRP can provide the network device 102 with access to summary information regarding any number of routing protocols, such as Border Gateway Protocol (BGP) 112A, Open Shortest Path First (OSPF) 112B, Enhanced Interior Gateway Protocol 112N, and so forth (collectively, routing protocol 112), to determine neighboring network devices. RRP messages can include the details of error signatures. When the network device 102 generates an event (e.g., critical error, crash, etc.), the RRP module 104 can generate an error hash code from the event attributes. For example, the error signature may be in the format of a Cisco Internetworking Operating System (IOS®) system message, such as "ASR1000_DSP: Error Message % ASR1000_DSP-3-ENQUEFAIL: Enqueue of TDL message failed (% s)" indicating that an unexpected condition has occurred in a Cisco® Aggregation Services Router (ASR) 1000 Series device which resulted in configuration, resource, or call details not being forwarded. The RRP module 104 can generate a hash code (e.g., "06dcb44b-111b-4c1a-bbd3-8a1cce9ddcc0") from this error signature, compare the error signature to a published error or diagnostic signature pack to identify the severity of the event, and broadcast the signature to neighboring devices if the severity of the event satisfies a criticality threshold.

Figure 2A:
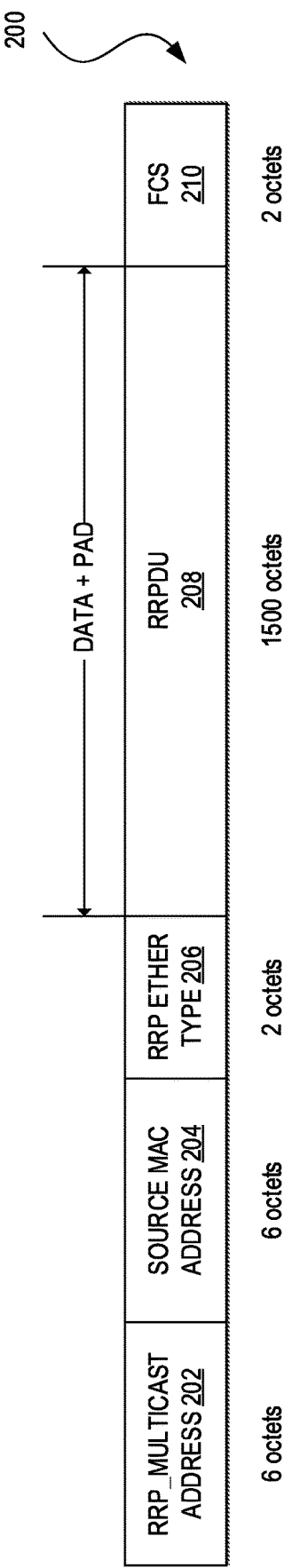
FIGS. 2A-2C illustrate examples of formats for RRP messages in accordance with an embodiment.
Figure 2B:
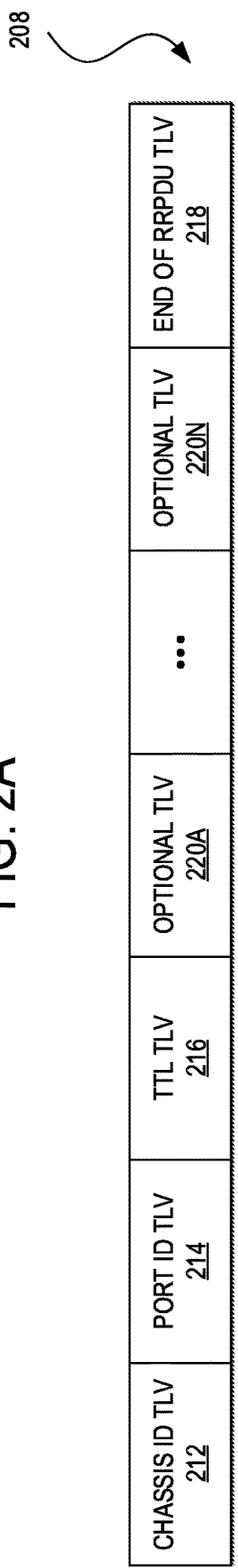
Figure 2C:
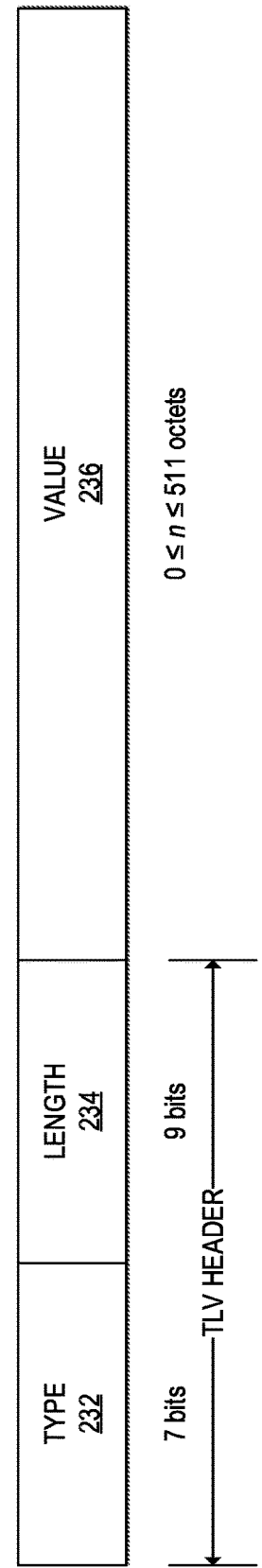

FIGS. 2A-2C show examples of formats for a frame, a protocol data unit (PDU), and a basic type-length-value (TLV) for Return and Replacement Protocol (RRP). One of ordinary skill in the art will understand that, for the protocol formats and any protocol discussed in the present disclosure, there can be additional or fewer fields in similar or alternative sequences. Although discussed in the present disclosure as an independent protocol, in other embodiments, RRP may be an extension of an existing protocol, such as Link Layer Discovery Protocol (LLDP), Neighbor Discovery Protocol (NDP), or other network protocol. In addition, other embodiments may include different numbers or types of fields, sizes of fields, or mandatory fields but one of ordinary skill the art will appreciate that such variations do not depart from the scope of the present disclosure.

FIG. 2A shows an example of a format for an RRP frame 200. The RRP frame 200 can include a destination address 202, a source address 204, an ether type 206, a payload 208, and a frame check sequence (FCS) 210. The destination address 202 may identify a multicast address designated for RRP. The source address 204 may identify the network device 102 originating the RRP frame 200. The ether type 206 may identify the protocol encapsulated in the payload 208. In some embodiments, the ether type 206 may also identify the size of the payload 208 and/or the RRP frame 200. The payload 208 can include RRP data and padding and is discussed in further detail with respect to FIG. 2B. The FCS 210 may identify an error-detecting code, if any, associated with the RRP frame 200.

FIG. 2B shows an example of a format for the payload 208 or a Return and Replacement Protocol Data Unit (RRPDU). The payload 208 can include a set of formatted records or type-length-values (TLVs) for providing and error and other diagnostic information regarding the network device 102. In this example, the payload 208 comprises a set of mandatory TLVs, including a chassis identifier TLV 212, a port identifier TLV 214, a time-to-live (TTL) TLV 216, and an end of RRPDU TLV 218. The chassis identifier TLV 212 can include a globally unique identifier for identifying the network device 102. The port identifier TLV 214 can identify the port from which the network device 102 sends RRP messages to a particular neighboring device. The TTL TLV 216 can provide RRP message aging information. The end of RRPDU TLV 218 can mark the end of RRP processing. The payload 208 can also include a set of optional TLVs 220A . . . 220N (collectively, 220), that can provide diagnostic information such as the system name, system description, management address, error or crash code including data regarding system unresponsiveness or system crash, error parameters, optional fields, and so forth. Table 1 sets forth examples of RRP TLVs.

TABLE 1

Examples of RRP TLVs

| TLV Type | TLV Name | Description | Usage in RRPDU |
|---|---|---|---|
| 0 | End of RRPDU | A TLV marking the end of RRP TLVs in the RRPDU | Mandatory |
| 1 | Chassis Identifier | An administratively assigned name that identifies a particular chassis within the context of an administrative domain that comprises one or more networks | Mandatory |
| 2 | Port Identifier | An administratively assigned name that identifies a particular port within the context of a system, where the identification is convenient, local to the system, and persistent for the system's use and management | Mandatory |
| 3 | Time-to-live | Indicates the number of seconds that an RRP recipient is to regard the information in an RRP message to be valid; when the value is non-zero, the RRP recipient is notified to completely replace all information associated with the RRP sender with the information in the received RRPDU; when the value is zero, the RRP recipient is notified all system information associated with the RRP sender is to be deleted | Mandatory |
| 4 | Port Description | An administratively assigned description of the port | Optional |
| 5 | System Name | An administratively assigned name of the system | Optional |
| 6 | System Description | An administratively assigned description of the system | Optional |
| 7 | System Capabilities | Identifies the primary function(s) of the system and whether or not these primary functions are enabled | Optional |
| 8 | Management Address | Identifies an address associated with the local RRP agent that may be used to reach higher layer entities to assist exchange of error information | Optional |
| 9 | Error or crash code | A unique identifier for the error or crash. In some embodiments, the error or crash code can map to:<br>a) Facility: a unique identifier for a facility to which a message refers; a facility can be a hardware device, a protocol, or a module of the system software<br>b) Subfacility: when the facility operates in a distributed system, the subfacility can identify the part of the distributed system from where the message is coming<br>c) Severity: a code that can indicate the severity of the error or crash; Table 2 sets forth an example of severity levels of an error or crash<br>d) Mnemonic: a code that uniquely identifies the system message<br>e) Message: a description of the error or crash condition. In some embodiments, the message can include detailed information about the event, such as terminal port numbers, network addresses, or addresses that correspond to locations in the system memory address space. The information in these variable fields can change from message to message and may be populated by Error Parameter TLVs; Table 3 sets forth an example of the representations of variable fields in a message and the type of information in them | Optional |
| 10 | Error Parameter | Variable field in an error message; Table 3 sets forth an example of the representations of variable fields in a message and the type of information in them | Optional |
| 11-126 | Reserved | A code that reflects the severity of the error or crash | Optional |
| 127 | Custom TLVs | TLVs for extending RRP | Optional |

TABLE 2

Examples of Error Severity Levels

| Level | Description |
|---|---|
| 0—emergency | System unusable |
| 1—alert | Immediate action needed |
| 2—critical | Critical condition |
| 3—error | Error condition |
| 4—warning | Warning condition |
| 5—notification | Normal but significant condition |
| 6—informational | Informational message only |
| 7—debugging | Appears during debugging only |

TABLE 3

Examples of Variable Fields in Error Messages

| Representation | Type of Information |
|---|---|
| [atalk_address] | AppleTalk address |
| [atalk_net] | AppleTalk network, either 600 or 600-601 |
| [char] | Single character |
| [chars] | Character string |
| [dec] | Decimal number |
| [enet] | Ethernet address (e.g., 0000.FEED.00C0) |
| [hex] | Hexadecimal number |
| [inet] | Internet address (e.g., 10.0.2.16) |
| [int] | Integer |
| [ipv6_addr] | IP version 6 (IPv6) address |
| [node] | Address or node name |
| [p] | IPv6 address |
| [sci_notation] | Scientific notation |
| [t-line] | Terminal line number in octal (or in decimal if the decimal-TTY service is enabled) |
| [v-name] | VINES name; or number (hex or decimal) |

In some embodiments, RRP may prohibit multiple different RRP messages on the same port.

TABLE 4

Examples of Silicon Aging Factors

| Failure Mechanism | Screening and Testing Methodology |
|---|---|
| Oxide Defects | High Temperature operating life (HTOL) and voltage stress. |
| Silicon Defects | HTOL and voltage stress screens. |
| Corrosion | Highly Accelerated Stress Testing (HAST). |
| Assembly Defects | Temperature cycling, temperature and mechanical shock, and environmental stressing. |
| Electromigration Al line Contact/Via | Test vehicle characterizations at highly elevated temperatures. |
| Mask Defects/ Photoresist Defects | Mask Fab comparisons, print checks, defect density monitor in Fab, voltage stress test and HTOL. |
| Contamination | C-V stress of oxides, wafer fab device stress test and HTOL. |
| Charge Injection | HTOL and oxide characterization. |

Table 5 sets forth examples of metrics that may be used for calculating silicon failure rates.

TABLE 5

Examples of Silicon Failure Metrics

| Metric | Description |
|---|---|
| Failure Rate ($\lambda$) | Measure of failure per unit of time. The useful life failure rate can be based on the exponential life distribution. The failure rate can decrease slightly over early life, then stabilize until wear-out, which can show an increasing failure rate. A simple failure rate calculation is: (Equation 1) $$\lambda \propto \frac{1}{TDH \times AF}$$ |
| Failure In Time (FIT) | Measure of failure rate in 10⁹ device hours (e.g. 1 FIT = 1 failure in 10⁹ device hours) |
| Total Device Hours (TDH) | The summation of the number of units in operation multiplied by the time of operation |
| Mean Time To Failure (MTTF) | Mean of the life distribution for the population of devices under operation or expected lifetime of an individual, MTTF = $1/\lambda$, which is the time where 63.2% of the population has failed. Example: For $\lambda$ = 10 FITs, MTTF = $1/\lambda$ = 100 million hours. |
| Confidence Level or Limit (CL) | Probability level at which population failure rate estimates are derived from sample life test. The upper confidence level interval can be used. |
| Acceleration Factor (AF) | A constant that can be derived from experimental data which relates the times to failure at two different stresses. The AF can allow extrapolation of failure rates from accelerated test conditions to use conditions. |

FIG. 2C illustrates an example of a format for a basic type-length-value (TLV) record 230. The TLV 230 can include a type field 232, a length field 234, and a value field 236. As discussed, Table 1 sets forth examples of different types and values of TLVs that may be used in RRP. The length field 234 can identify the length of the value field 236 in octets. In this example, the length field 234 is 9 bits in length, and thus, the value field 236 can be between 0 and 511 octets.

Returning to FIG. 1, the RRP module 104 may also include a mean time to failure (MTTF) component 114 for capturing data that may be relevant to computing silicon failure rates. Table 4 sets forth examples of different silicon failure mechanisms and potential tests that the RRP module 104 can run and/or for which the RRP module 104 can store data relevant to the tests.

Figure 3:
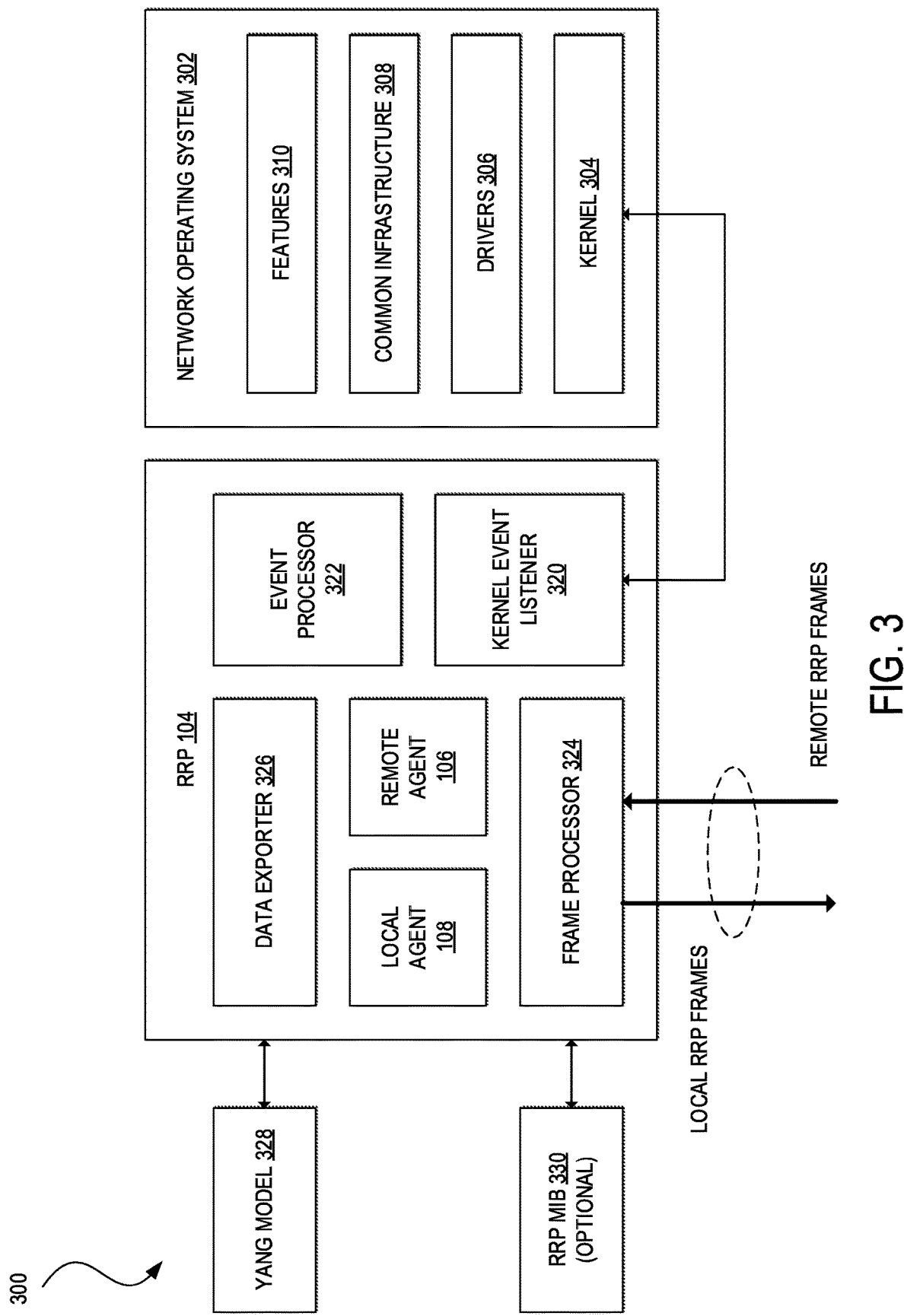
FIG. 3 illustrates an example of a processing framework for RRP in accordance with an embodiment.

FIG. 3 illustrates an example of a processing framework 300 for RRP. In this example, the processing framework 300 shows the RRP module 104 interconnected to a network device operating system 302 (e.g., Cisco IOS®, Cisco IOS® XE, Cisco IOS® XR, Cisco® NX-OS, Cisco® Catalyst OS (CatOS), etc.) at a kernel 304 of the operating system 302. The kernel 304 can provide basic system services to the rest of the network device operating system 302, such as memory management and process scheduling. In addition, the kernel 304 can provide hardware (e.g., CPU, memory, etc.) resource management for processes.

The network device operating system 302 can also include drivers 306, a common infrastructure layer 308, and features 310. The drivers 306 can comprise functions to control network interface hardware and peripherals (e.g., flash card). That is, the drivers 306 can operate as interfaces between processes of the network device operating system 302, the kernel 304, and hardware of the network device. The common infrastructure layer 308 can sit on top of the kernel 304 and the drivers 306, and can define how software can be installed on the network device, how processes may be started and sequenced, how high-availability and software upgrades can be performed, and how applications can be managed from an operational perspective. The features 310 can include any number of functions provided by a network device, such as routing, switching, internetworking, quality of service (QoS), telecommunication functions, security, high availability, and so forth.

As shown in this example, the RRP module 104 can include a kernel-level event listener 320 for monitoring events, such as errors or crashes, which may occur in the network device. An event processor 322 can process these events for further handling by the local agent 106 and the remote agent 108. The local agent 106 can receive event or crash data from the event processor 322, extract relevant parameters, and store the relevant parameters in non-volatile memory via a data exporter 326. The data exporter 326 may format the event or crash data according to a Yet Another Next Generation (YANG) data model 328 that may be accessible via SNMP, NETCONF, or other suitable protocol. In some embodiments, the data exporter 326 can also format the event or crash data for storage in an RRP management information base (MIB) 330. If the event satisfies a criticality threshold, the remote agent 108 can generate an RRP frame from the event or crash data for transmission to neighboring network devices via a frame processor 324. In addition to transmitting RRP frames, the frame processor 324 can also receive RRP frames from neighboring network devices for persistence locally.

In some embodiments, the RRP module 104 may support a command line interface for accessing RRP information. Table 6 sets forth an example of such a command line interface.

TABLE 6

Example RRP Command Line Interface commands

| Command | Purpose |
|---|---|
| show rrp | Displays detailed analysis of all probes collected during a specified time interval (e.g., absolute, periodic, etc.). For example, the output can include a device identifier, process identifier, process details, crash code, crash message, timestamp, occurrence, priority. |
| show rrp neighbors | Displays critical errors of all probes collected during a specified time interval. For example, the output can include a device identifier, process identifier, process details, crash code, crash message, timestamp, occurrence, priority, and neighbor device identifier. |
| show rrp probes | Displays details of RRP probes. |

In some embodiments, the RRP module 104 may be one of the very first processes to be executed during boot-up. For example, the RRP module 104 may be executed as part of a power on self-test (POST) utility, a bootstrap program, or other boot system command before the network device loads its operating system. The RRP module 104 can check the RRP database for any past events and notify neighboring devices before the next reboot. As another example, the RRP module 104 can be given higher or highest process priority (at least at boot-up) to ensure that the network device transmits any past crash/error events that have not yet been transmitted and that the network device does not execute other processes that may be causing the device to endlessly reboot. In this manner, the network device may be capable of transmitting RRP frames despite continuously rebooting.

Figure 4:
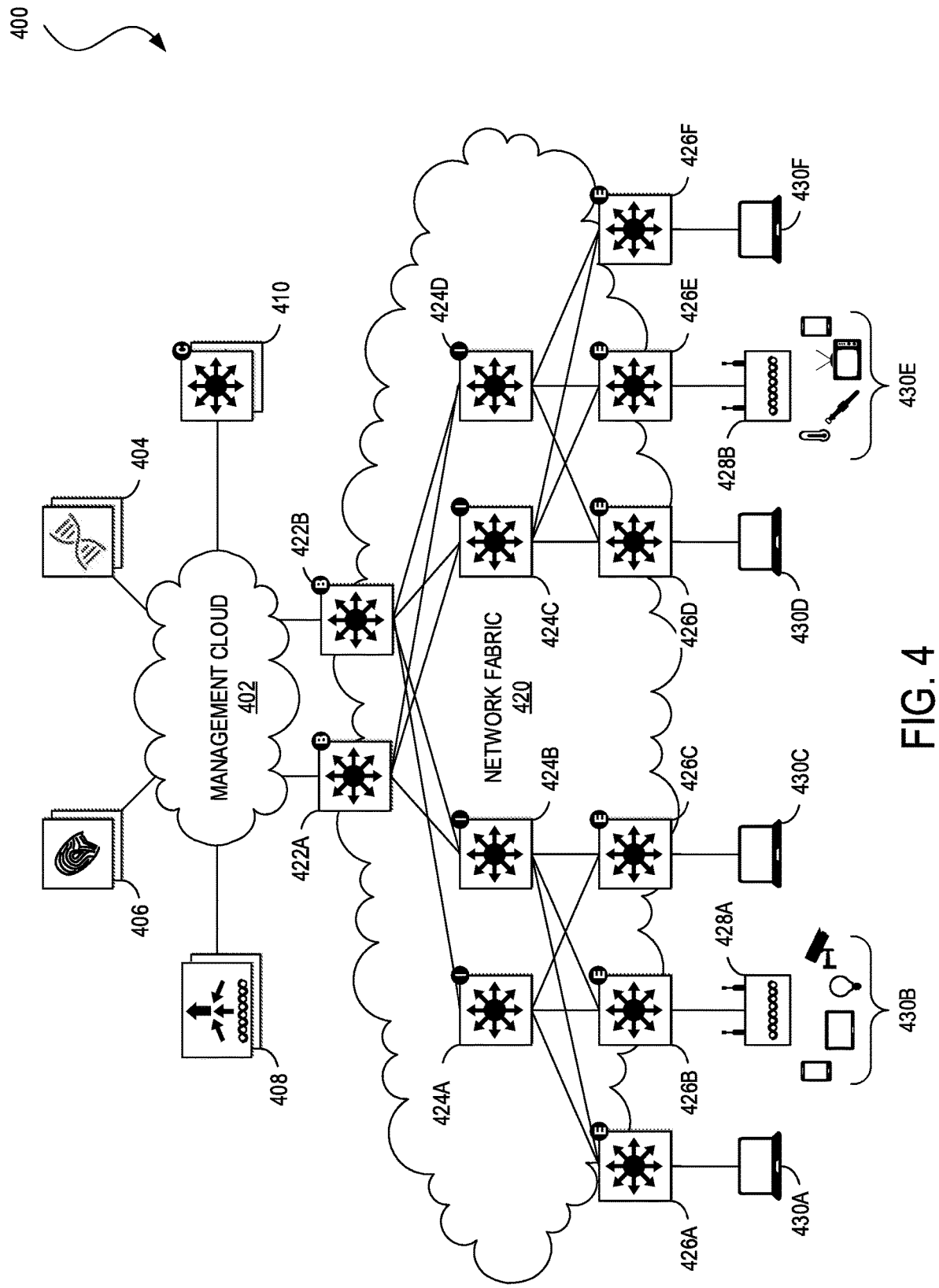
FIG. 4 illustrates an example of a physical topology for an enterprise network in accordance with an embodiment.

FIG. 4 illustrates an example of a physical topology of an enterprise network 400. It should be understood that, for the enterprise network 400 and any network discussed herein, there can be additional or fewer nodes, devices, links, networks, or components in similar or alternative configurations. Example embodiments with different numbers and/or types of endpoints, nodes, cloud components, servers, software components, devices, virtual or physical resources, configurations, topologies, services, appliances, or deployments are also contemplated herein. Further, the enterprise network 400 can include any number or type of resources, which can be accessed and utilized by endpoints or network devices. The illustrations and examples provided herein are for clarity and simplicity.

In this example, the enterprise network 400 includes a management cloud 402 and a network fabric 420. Although shown as an external network or cloud to the network fabric 420 in this example, the management cloud 402 may alternatively or additionally reside on the premises of an organization or in a colocation center (in addition to being hosted by a cloud provider or similar environment). The management cloud 402 can provide a central management plane for building and operating the network fabric 420. The management cloud 402 can be responsible for forwarding configuration and policy distribution, as well as device management and analytics. The management cloud 402 can comprise one or more network controller appliances 404, one or more authentication, authorization, and accounting (AAA) appliances 406, one or more wireless local area network controllers (WLCs) 408, and one or more fabric control plane nodes 410. In other embodiments, one or more elements of the management cloud 402 may be co-located with the network fabric 420.

The network controller appliance(s) 404 can function as the command and control system for one or more network fabrics, and can house automated workflows for deploying and managing the network fabric(s). The network controller appliance(s) 404 can include automation, design, policy, provisioning, and assurance capabilities, among others, as discussed further below with respect to FIG. 5. In some embodiments, one or more Cisco Digital Network Architecture (Cisco DNA™) appliances can operate as the network controller appliance(s) 404.

The AAA appliance(s) 406 can control access to computing resources, facilitate enforcement of network policies, audit usage, and provide information necessary to bill for services. The AAA appliance can interact with the network controller appliance(s) 404 and with databases and directories containing information for users, devices, things, policies, billing, and similar information to provide authentication, authorization, and accounting services. In some embodiments, the AAA appliance(s) 406 can utilize Remote Authentication Dial-In User Service (RADIUS) or Diameter to communicate with devices and applications. In some embodiments, one or more Cisco® Identity Services Engine (ISE) appliances can operate as the AAA appliance(s) 406.

The WLC(s) 408 can support fabric-enabled access points attached to the network fabric 420, handling traditional tasks associated with a WLC as well as interactions with the fabric control plane for wireless endpoint registration and roaming. In some embodiments, the network fabric 420 can implement a wireless deployment that moves data-plane termination (e.g., VXLAN) from a centralized location (e.g., with previous overlay Control and Provisioning of Wireless Access Points (CAPWAP) deployments) to an access point/fabric edge node. This can enable distributed forwarding and distributed policy application for wireless traffic while retaining the benefits of centralized provisioning and administration. In some embodiments, one or more Cisco® Wireless Controllers, Cisco® Wireless LAN, and/or other Cisco DNA™-ready wireless controllers can operate as the WLC(s) 408.

The network fabric 420 can comprise fabric border nodes 422A and 422B (collectively, 422), fabric intermediate nodes 424A-D (collectively, 424), and fabric edge nodes 426A-F (collectively, 426). Although the fabric control plane node(s) 410 are shown to be external to the network fabric 420 in this example, in other embodiments, the fabric control plane node(s) 410 may be co-located with the network fabric 420. In embodiments where the fabric control plane node(s) 410 are co-located with the network fabric 420, the fabric control plane node(s) 410 may comprise a dedicated node or set of nodes or the functionality of the fabric control node(s) 410 may be implemented by the fabric border nodes 422.

The fabric control plane node(s) 410 can serve as a central database for tracking all users, devices, and things as they attach to the network fabric 420, and as they roam around. The fabric control plane node(s) 410 can allow network infrastructure (e.g., switches, routers, WLCs, etc.) to query the database to determine the locations of users, devices, and things attached to the fabric instead of using a flood and learn mechanism. In this manner, the fabric control plane node(s) 410 can operate as a single source of truth about where every endpoint attached to the network fabric 420 is located at any point in time. In addition to tracking specific endpoints (e.g., /32 address for IPv4, /128 address for IPv6, etc.), the fabric control plane node(s) 410 can also track larger summarized routers (e.g., IP/mask). This flexibility can help in summarization across fabric sites and improve overall scalability.

The fabric border nodes 422 can connect the network fabric 420 to traditional Layer 3 networks (e.g., non-fabric networks) or to different fabric sites. The fabric border nodes 422 can also translate context (e.g., user, device, or thing mapping and identity) from one fabric site to another fabric site or to a traditional network. When the encapsulation is the same across different fabric sites, the translation of fabric context is generally mapped 1:1. The fabric border nodes 422 can also exchange reachability and policy information with fabric control plane nodes of different fabric sites. The fabric border nodes 422 also provide border functions for internal networks and external networks. Internal borders can advertise a defined set of known subnets, such as those leading to a group of branch sites or to a data center. External borders, on the other hand, can advertise unknown destinations (e.g., to the Internet similar in operation to the function of a default route).

The fabric intermediate nodes 424 can operate as pure Layer 3 forwarders that connect the fabric border nodes 422 to the fabric edge nodes 426 and provide the Layer 3 underlay for fabric overlay traffic.

The fabric edge nodes 426 can connect endpoints to the network fabric 420 and can encapsulate/decapsulate and forward traffic from these endpoints to and from the network fabric. The fabric edge nodes 426 may operate at the perimeter of the network fabric 420 and can be the first points for attachment of users, devices, and things and the implementation of policy. In some embodiments, the network fabric 420 can also include fabric extended nodes (not shown) for attaching downstream non-fabric Layer 2 network devices to the network fabric 420 and thereby extend the network fabric. For example, extended nodes can be small switches (e.g., compact switch, industrial Ethernet switch, building automation switch, etc.) which connect to the fabric edge nodes via Layer 2. Devices or things connected to the fabric extended nodes can use the fabric edge nodes 426 for communication to outside subnets.

In this example, the network fabric can represent a single fabric site deployment which can be differentiated from a multi-site fabric deployment as discussed further below with respect to FIG. 4.

In some embodiments, all subnets hosted in a fabric site can be provisioned across every fabric edge node 426 in that fabric site. For example, if the subnet 10.10.10.0/24 is provisioned in a given fabric site, this subnet may be defined across all of the fabric edge nodes 426 in that fabric site, and endpoints located in that subnet can be placed on any fabric edge node 426 in that fabric. This can simplify IP address management and allow deployment of fewer but larger subnets. In some embodiments, one or more Cisco® Catalyst switches, Cisco Nexus® switches, Cisco Meraki® MS switches, Cisco® Integrated Services Routers (ISRs), Cisco® Aggregation Services Routers (ASRs), Cisco® Enterprise Network Compute Systems (ENCS), Cisco® Cloud Service Virtual Routers (CSRvs), Cisco Integrated Services Virtual Routers (ISRvs), Cisco Meraki® MX appliances, and/or other Cisco DNA-ready™ devices can operate as the fabric nodes 422, 424, and 426.

The enterprise network 400 can also include wired endpoints 430A, 430C, 430D, and 430F and wireless endpoints 430B and 430E (collectively, 430). The wired endpoints 430A, 430C, 430D, and 430F can connect by wire to fabric edge nodes 426A, 426C, 426D, and 426F, respectively, and the wireless endpoints 430B and 430E can connect wirelessly to wireless access points 428B and 428E (collectively, 428), respectively, which in turn can connect by wire to fabric edge nodes 426B and 426E, respectively. In some embodiments, Cisco Aironet® access points, Cisco Meraki® MR access points, and/or other Cisco DNA™-ready access points can operate as the wireless access points 428.

The endpoints 430 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. The endpoints 430 can also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

In some embodiments, the network fabric 420 can support wired and wireless access as part of a single integrated infrastructure such that connectivity, mobility, and policy enforcement behavior are similar or the same for both wired and wireless endpoints. This can bring a unified experience for users, devices, and things that is independent of the access media.

In integrated wired and wireless deployments, control plane integration can be achieved with the WLC(s) 408 notifying the fabric control plane node(s) 410 of joins, roams, and disconnects by the wireless endpoints 430 such that the fabric control plane node(s) can have connectivity information about both wired and wireless endpoints in the network fabric 420, and can serve as the single source of truth for endpoints connected to the network fabric. For data plane integration, the WLC(s) 408 can instruct the fabric wireless access points 428 to form a VXLAN overlay tunnel to their adjacent fabric edge nodes 426. The AP VXLAN tunnel can carry segmentation and policy information to and from the fabric edge nodes 426, allowing connectivity and functionality identical or similar to that of a wired endpoint. When the wireless endpoints 430 join the network fabric 420 via the fabric wireless access points 428, the WLC(s) 408 can onboard the endpoints into the network fabric 420 and inform the fabric control plane node(s) 410 of the endpoints' Media Access Control (MAC) addresses. The WLC(s) 408 can then instruct the fabric wireless access points 428 to form VXLAN overlay tunnels to the adjacent fabric edge nodes 426. Next, the wireless endpoints 430 can obtain IP addresses for themselves via Dynamic Host Configuration Protocol (DHCP). Once that completes, the fabric edge nodes 426 can register the IP addresses of the wireless endpoint 430 to the fabric control plane node(s) 410 to form a mapping between the endpoints' MAC and IP addresses, and traffic to and from the wireless endpoints 430 can begin to flow.

Figure 5:
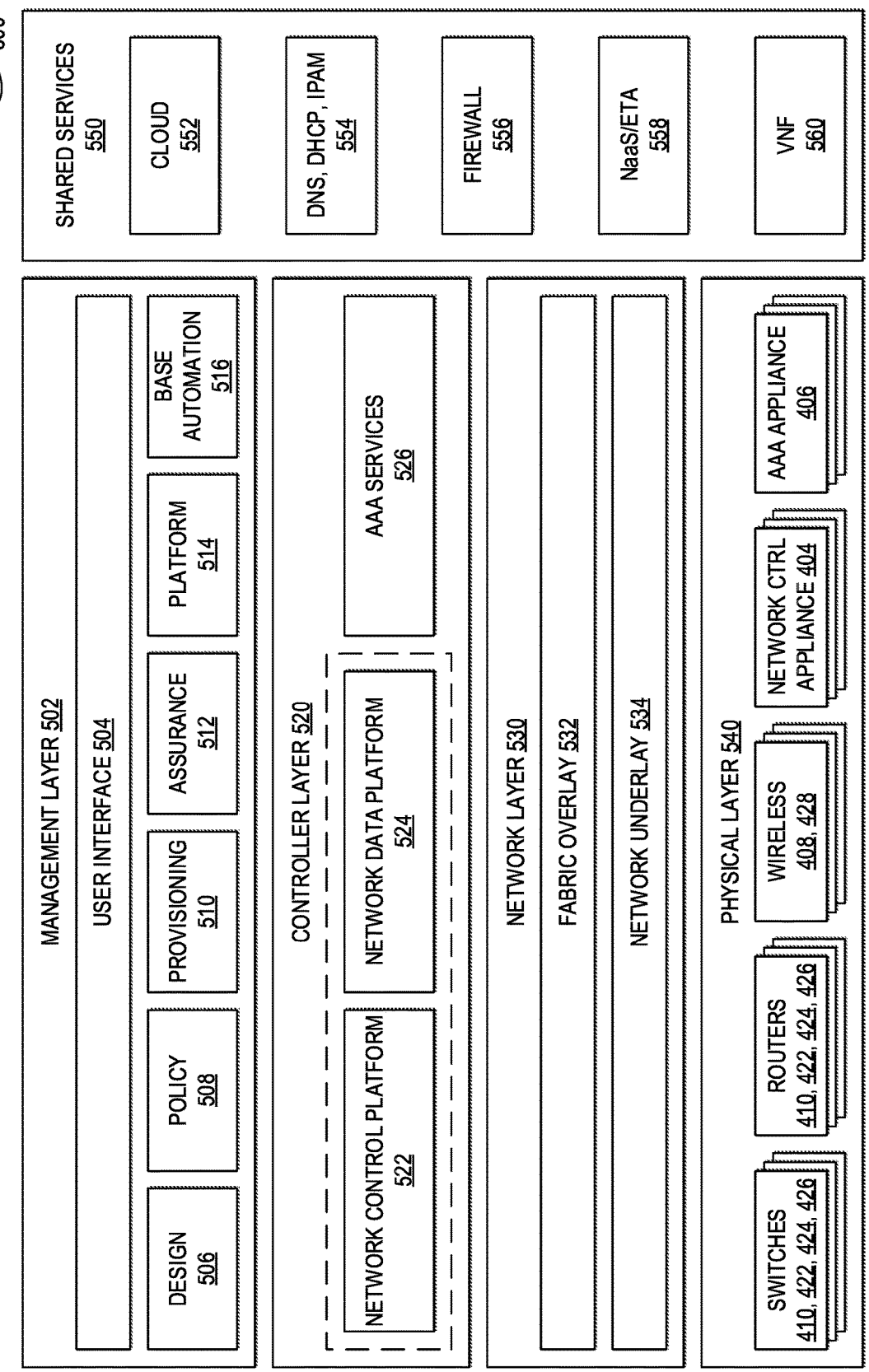
FIG. 5 illustrates an example of a logical architecture for an enterprise network in accordance with an embodiment.

FIG. 5 illustrates an example of a logical architecture 500 for an enterprise network (e.g., the enterprise network 400). One of ordinary skill in the art will understand that, for the logical architecture 500 and any system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure. In this example, the logical architecture 500 includes a management layer 502, a controller layer 520, a network layer 530 (such as embodied by the network fabric 420), a physical layer 540 (such as embodied by the various elements of FIG. 4), and a shared services layer 550.

The management layer 502 can abstract the complexities and dependencies of other layers and provide a user with tools and workflows to manage an enterprise network (e.g., the enterprise network 400). The management layer 502 can include a user interface 504, design functions 506, policy functions 508, provisioning functions 510, assurance functions 512, platform functions 514, and base automation functions 516. The user interface 504 can provide a user a single point to manage and automate the network. The user interface 504 can be implemented within a web application/web server accessible by a web browser and/or an application/application server accessible by a desktop application, a mobile app, a shell program or other command line interface (CLI), an Application Programming Interface (e.g., restful state transfer (REST), Simple Object Access Protocol (SOAP), Service Oriented Architecture (SOA), gRPC Remote Procedure Calls (gRPC), etc.), and/or other suitable interface in which the user can configure network infrastructure, devices, and things that are cloud-managed; provide user preferences; specify policies, enter data; review statistics; configure interactions or operations; and so forth. The user interface 504 may also provide visibility information, such as views of a network, network infrastructure, computing devices, and things. For example, the user interface 504 can provide a view of the status or conditions of the network, the operations taking place, services, performance, a topology or layout, protocols implemented, running processes, errors, notifications, alerts, network structure, ongoing communications, data analysis, and so forth.

The design functions 506 can include tools and workflows for managing site profiles, maps and floor plans, network settings, and IP address management, among others. The policy functions 508 can include tools and workflows for defining and managing network policies. The provisioning functions 510 can include tools and workflows for deploying the network. The assurance functions 512 can use machine learning and analytics to provide end-to-end visibility of the network by learning from the network infrastructure, endpoints, and other contextual sources of information. The platform functions 514 can include tools and workflows for integrating the network management system with other technologies. The base automation functions 516 can include tools and workflows to support the policy functions 508, the provisioning functions 510, the assurance functions 512, and the platform functions 514.

In some embodiments, the design functions 506, the policy functions 508, the provisioning functions 510, the assurance functions 512, the platform functions 514, and the base automation functions 516 can be implemented as microservices in which respective software functions are implemented in multiple containers communicating with each rather than amalgamating all tools and workflows into a single software binary. Each of the design functions 506, policy functions 508, provisioning functions 510, assurance functions 512, and platform functions 514 can be viewed as a set of related automation microservices to cover the design, policy authoring, provisioning, assurance, and cross-platform integration phases of the network lifecycle. The base automation functions 516 can support the top-level functions by allowing users to perform certain network-wide tasks.

Figure 6A:
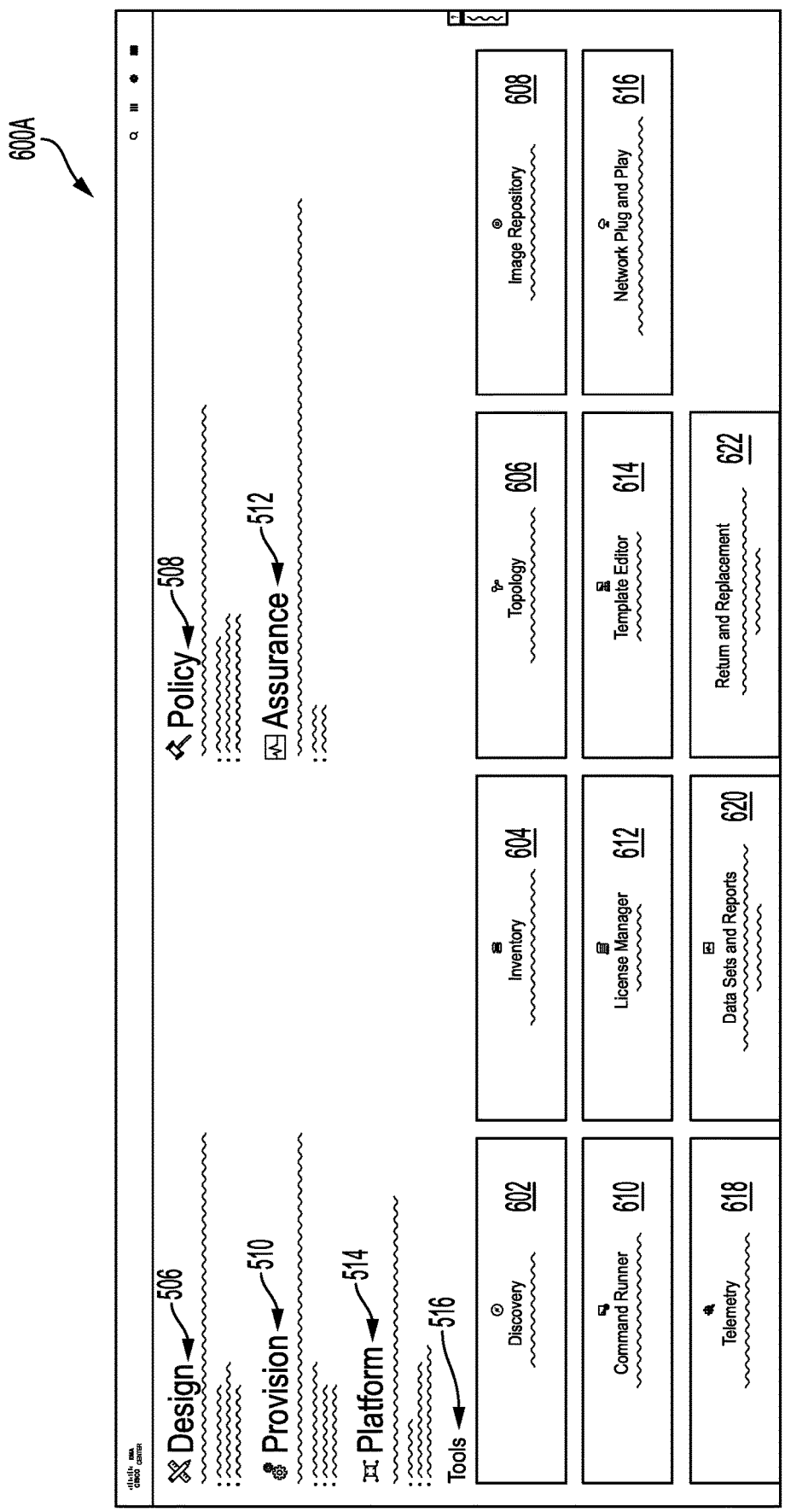
FIGS. 6A-6C illustrate examples of graphical user interfaces for a network management system in accordance with an embodiment.
Figure 6B:
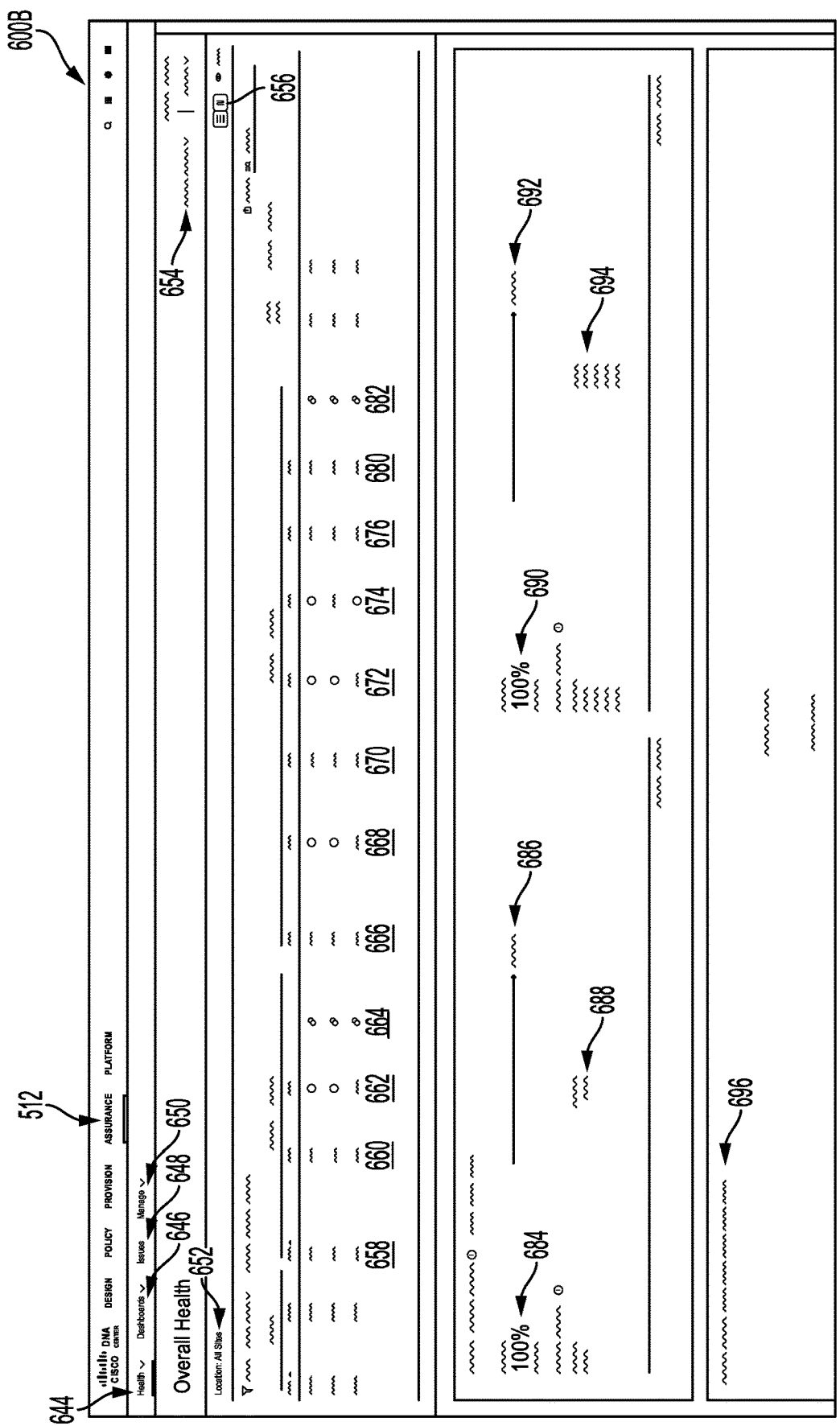
Figure 6C:
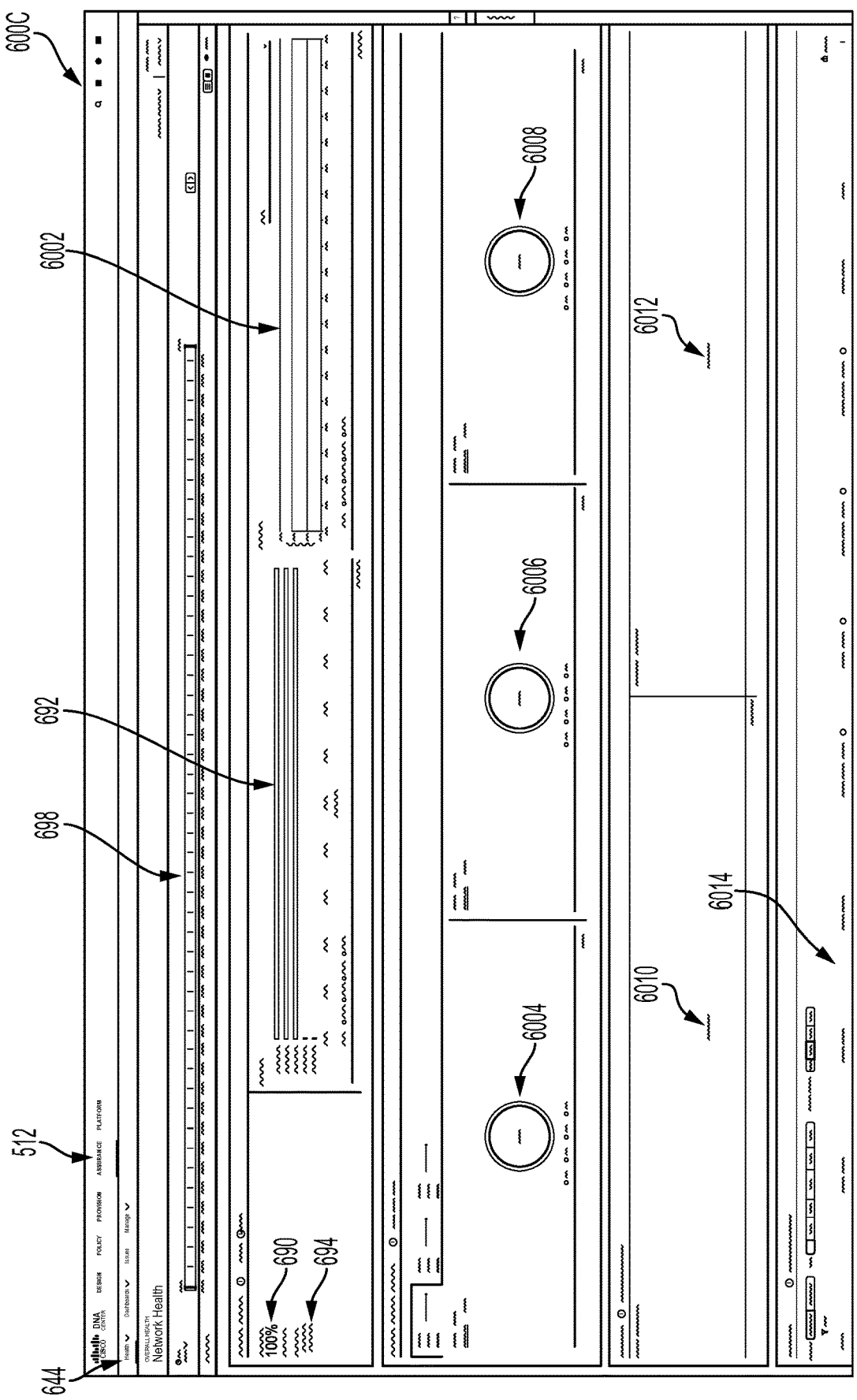

FIGS. 6A-6C illustrate examples of graphical user interfaces for implementing the user interface 504. Although FIGS. 6A-6C show the graphical user interfaces as comprising webpages displayed in a browser executing on a large form-factor general purpose computing device (e.g., server, workstation, desktop, laptop, etc.), the principles disclosed in the present disclosure are widely applicable to client devices of other form factors, including tablet computers, smart phones, wearable devices, or other small form-factor general purpose computing devices; televisions; set top boxes; IoT devices; and other electronic devices capable of connecting to a network and including input/output components to enable a user to interact with a network management system. One of ordinary skill will also understand that the graphical user interfaces of FIGS. 6A-6C are but one example of a user interface for managing a network. Other embodiments may include a fewer number or a greater number of elements.

FIG. 6A illustrates a graphical user interface 600A, which is an example of a landing screen or a home screen of the user interface 504. The graphical user interface 600A can include user interface elements for selecting the design functions 506, the policy functions 508, the provisioning functions 510, the assurance functions 512, and the platform functions 514. The graphical user interface 600A also includes user interface elements for selecting the base automation functions 516. In this example, the base automation functions 516 include:

- A network discovery tool 602 for automating the discovery of existing network elements to populate into inventory;
- An inventory management tool 604 for managing the set of physical and virtual network elements;
- A topology tool 606 for visualizing the physical topology of network elements;
- An image repository tool 608 for managing software images for network elements;
- A command runner tool 610 for diagnosing one or more network elements based on a CLI;
- A license manager tool 612 for administering visualizing software license usage in the network;
- A template editor tool 614 for creating and authoring CLI templates associated with network elements in a design profile;
- A network PnP tool 616 for supporting the automated configuration of network elements;
- A telemetry tool 618 for designing a telemetry profile and applying the telemetry profile to network elements;
- A data set and reports tool 620 for accessing various data sets, scheduling data extracts, and generating reports in multiple formats (e.g., Post Document Format (PDF), comma-separate values (CSV), Tableau, etc.), such as an inventory data report, a software image management (SWIM) server report, and a client data report, among others; and
- A Return Merchandise Authorization (RMA) tool 622 for automatically determining whether any network devices should be marked for RMA.

FIG. 6B illustrates a graphical user interface 600B, an example of a landing screen for the assurance functions 512. The graphical user interface 600B can include various tools and workflows for managing the network. In this example, the assurance tools and workflows include:

- A health overview tool 644 for providing a global view of the enterprise network, including network devices and endpoints. The user interface element (e.g., drop-down menu, a dialog box, etc.) associated with the health overview tool 644 can also be toggled to switch to additional or alternative views, such as a view of the health of network devices alone (discussed further below with respect to FIG. 6C), a view of the health of all wired and wireless clients, and a view of the health of applications running in the network;
- An assurance dashboard tool 646 for managing and creating custom dashboards;
- An issues tool 648 for displaying and troubleshooting network issues; and
- A sensor management tool 650 for managing sensor-driven tests.

The graphical user interface 600B can also include a location selection user interface element 652, a time period selection user interface element 654, and a view type user interface element 656. The location selection user interface element 652 can enable a user to view the overall health of specific sites and/or network domains (e.g., LAN, WLAN, WAN, data center, etc.). The time period selection user interface element 654 can enable display of the overall health of the network over specific time periods (e.g., last 3 hours, last 24 hours, last 7 days, custom, etc.). The view type user interface element 656 can enable a user to toggle between a geographical map view of the sites of the network (not shown) or a hierarchical site/building view (as shown).

Within the hierarchical site/building view, rows can represent the network hierarchy; column 658 can indicate the number of healthy clients as a percentage; column 660 can indicate the health of wireless clients by a score (e.g., 1-10), color and/or descriptor (e.g., red or critical associated with a health score 1 to 3 indicating the clients have critical issues, orange or warning associated with a health score of 4 to 7 indicating warnings for the clients, green or no errors or warnings associated with a health score of 8 to 10, grey or no data available associated with a health score of null or 0), or other indicator; column 662 can indicate the health of wired clients by score, color, descriptor, and so forth; column 664 can include user interface elements for drilling down to the health of the clients associated with a hierarchical site/building; column 666 can indicate the number of healthy network devices as a percentage; column 668 can indicate the health of access switches by score, color, descriptor, and so forth; column 670 can indicate the health of core switches by score, color, descriptor, and so forth; column 672 can indicate the health of distribution switches by score, color, descriptor, and so forth; column 674 can indicate the health of routers by score, color, descriptor, and so forth; column 676 can indicate the health of WLCs by score, color, descriptor, and so forth; column 678 can indicate the health of other network devices by score, color, descriptor, and so forth; and column 680 can include user interface elements for drilling down to the health of the network devices associated with a hierarchical site/building. In other embodiments, client devices may be grouped in other ways besides wired or wireless, such as by device type (e.g., desktop, laptop, mobile phone, IoT device or more specific type of IoT device, etc.), manufacturer, model, operating system, and so forth. Likewise, network devices can also be grouped along these and other ways in additional embodiments.

The graphical user interface 600B can also include an overall health summary user interface element (e.g., a view, pane, tile, card, container, widget, dashlet, etc.) that includes a client health summary user interface element 684 indicating the number of healthy clients as a percentage, a color coded trend chart 686 indicating that percentage over a specific time period (e.g., as selected by the time period selection user interface element 654), a user interface element 688 breaking down the number of healthy clients as a percentage by client type (e.g., wireless, wired), a network infrastructure health summary user interface element 690 indicating the number of health network devices as a percentage, a color coded trend chart 692 indicating that percentage over a specific time period, and a user interface element 694 breaking down the number of network devices as a percentage by network device type (e.g., core switch, access switch, distribution switch, etc.).

The graphical user interface 600B can also include an issues user interface element 696 listing issues, if any, that must be addressed. Issues can be sorted based on timestamp, severity, location, device type, and so forth. Each issue may be selected to drill down to view a more detailed view of the selected issue.

FIG. 6C illustrates a graphical user interface 600C, an example of a screen for an overview of the health of network devices alone, which may be navigated to, for instance, by toggling the health overview tool 644. The graphical user interface 600C can include a timeline slider 698 for selecting a more granular time range than a time period selection user interface element (e.g., the time period selection user interface element 654). The graphical user interface 600C can also include similar information to that shown in the graphical user interface 600B, such as a user interface element comprising a hierarchical site/building view and/or geographical map view similar to that of the graphical user interface 600B (except providing information only for network devices) (not shown here), the network infrastructure health summary user interface element 690 indicating a number of healthy network devices as a percentage, the color coded trend charts 692 indicating the percentage by device type, the breakdown of the number of healthy network devices by device type 694, and so forth. In addition, the graphical user interface 600C can display a view of the health of network devices by network topology (not shown). This view can be interactive, such as by enabling a user to zoom in or out, pan left or right, or rotate the topology (e.g., by 90 degrees).

In this example, the graphical user interface 600C also includes a color coded trend chart 6002 showing the performance of the network devices over a specific time period; network health by device type tabs including a system health chart 6004 providing system monitoring metrics (e.g., CPU utilization, memory utilization, temperature, etc.), a data plane connectivity chart 6006 providing data plane metrics, such as uplink availability and link errors, and a control plane connectivity chart 6008 providing control plane metrics for each device type; an AP analytics user interface element including an up and down color coded chart 6010 that provides AP status information (e.g., the number of APs connected to the network, and the number of APs not connected to the network, etc.) and a top number N of APs by client count chart 6012 that provides information about the APs that have the highest number of clients; a network devices table 6014 enabling a user to filter (e.g., by device type, health, or custom filters), view, and export network device information. A detailed view of the health of each network device can also be provided by selecting that network device in the network devices table 6014.

Returning to FIG. 5, the controller layer 520 can comprise subsystems for the management layer 502 and may include a network control platform 522, a network data platform 524, and AAA services 526. These controller subsystems can form an abstraction layer to hide the complexities and dependencies of managing many network elements and protocols.

The network control platform 522 can provide automation and orchestration services for the network layer 530 and the physical layer 540, and can include the settings, protocols, and tables to automate management of the network and physical layers. For example, the network control platform 522 can provide the design functions 506, the policy functions 508, the provisioning functions 510, the platform functions 514, and the base automation functions 516. In addition, the network control platform 530 can include tools and workflows for discovering switches, routers, wireless controllers, and other network infrastructure devices (e.g., the network discovery tool 602); maintaining network and endpoint details, configurations, and software versions (e.g., the inventory management tool 604); Plug-and-Play (PnP) for automating deployment of network infrastructure (e.g., the network PnP tool 616), Path Trace for creating visual data paths to accelerate the troubleshooting of connectivity problems, Easy QoS for automating quality of service to prioritize applications across the network, and Enterprise Service Automation (ESA) for automating deployment of physical and virtual network services, among others. The network control platform 522 can communicate with network elements using Network Configuration (NETCONF)/Yet Another Next Generation (YANG), Simple Network Management Protocol (SNMP), Secure Shell (SSH)/Telnet, and so forth. In some embodiments, the Cisco® Network Control Platform (NCP) can operate as the network control platform 522

The network data platform 524 can provide for network data collection, analytics, and assurance, and may include the settings, protocols, and tables to monitor and analyze network infrastructure and endpoints connected to the network. The network data platform 524 can collect multiple types of information from network infrastructure devices, including syslog, SNMP, NetFlow, Switched Port Analyzer (SPAN), and streaming telemetry, among others. The network data platform 524 can also collect use contextual information shared from In some embodiments, one or more Cisco DNA™ Center appliances can provide the functionalities of the management layer 502, the network control platform 522, and the network data platform 524. The Cisco DNA™ Center appliances can support horizontal scalability by adding additional Cisco DNA™ Center nodes to an existing cluster; high availability for both hardware components and software packages; backup and store mechanisms to support disaster discovery scenarios; role-based access control mechanisms for differentiated access to users, devices, and things based on roles and scope; and programmable interfaces to enable integration with third party vendors. The Cisco DNA™ Center appliances can also be cloud-tethered to provide for the upgrade of existing functions and additions of new packages and applications without having to manually download and install them.

The AAA services 526 can provide identity and policy services for the network layer 530 and physical layer 540, and may include the settings, protocols, and tables to support endpoint identification and policy enforcement services. The AAA services 526 can provide tools and workflows to manage virtual networks and security groups, and to create group-based policies and contracts. The AAA services 526 can identify and profile network infrastructure devices and endpoints using AAA/RADIUS, 802.1X, MAC Authentication Bypass (MAB), web authentication, and EasyConnect, among others. The AAA services 526 can also collect and use contextual information from the network control platform 522, the network data platform 524, and the shared services 550, among others. In some embodiments, Cisco® ISE can provide the AAA services 526.

The network layer 530 can be conceptualized as a composition of two layers, an underlay 534 comprising physical and virtual network infrastructure (e.g., routers, switches, WLCs, etc.) and a Layer 3 routing protocol for forwarding traffic, and an overlay 532 comprising a virtual topology for logically connecting wired and wireless users, devices, and things and applying services and policies to these entities. Network elements of the underlay 534 can establish connectivity between each other, such as via Internet Protocol (IP). The underlay may use any topology and routing protocol.

In some embodiments, the network controller 404 can provide a local area network (LAN) automation service, such as implemented by Cisco DNA™ Center LAN Automation, to automatically discover, provision, and deploy network devices. Once discovered, the automated underlay provisioning service can leverage Plug and Play (PnP) to apply the required protocol and network address configurations to the physical network infrastructure. In some embodiments, the LAN automation service may implement the Intermediate System to Intermediate System (IS-IS) protocol. Some of the advantages of IS-IS include neighbor establishment without IP protocol dependencies, peering capability using loopback addresses, and agnostic treatment of IPv4, IPv6, and non-IP traffic.

The overlay 532 can be a logical, virtualized topology built on top of the physical underlay 534, and can include a fabric data plane, a fabric control plane, and a fabric policy plane. In some embodiments, the fabric data plane can be created via packet encapsulation using Virtual Extensible LAN (VXLAN) with Group Policy Option (GPO). Some of the advantages of VXLAN-GPO include its support for both Layer 2 and Layer 3 virtual topologies (overlays), and its ability to operate over any IP network with built-in network segmentation.

In some embodiments, the fabric control plane can implement Locator/ID Separation Protocol (LISP) for logically mapping and resolving users, devices, and things. LISP can simplify routing by removing the need for each router to process every possible IP destination address and route. LISP can achieve this by moving remote destination to a centralized map database that allows each router to manage only its local routs and query the map system to locate destination endpoints.

The fabric policy plane is where intent can be translated into network policy. That is, the policy plane is where the network operator can instantiate logical network policy based on services offered by the network fabric 420, such as security segmentation services, quality of service (QoS), capture/copy services, application visibility services, and so forth.

Segmentation is a method or technology used to separate specific groups of users or devices from other groups for the purpose of reducing congestion, improving security, containing network problems, controlling access, and so forth. As discussed, the fabric data plane can implement VXLAN encapsulation to provide network segmentation by using the virtual network identifier (VNI) and Scalable Group Tag (SGT) fields in packet headers. The network fabric 420 can support both macro-segmentation and micro-segmentation. Macro-segmentation logically separates a network topology into smaller virtual networks by using a unique network identifier and separate forwarding tables. This can be instantiated as a virtual routing and forwarding (VRF) instance and referred to as a virtual network (VN). That is, a VN is a logical network instance within the network fabric 420 defined by a Layer 3 routing domain and can provide both Layer 2 and Layer 3 services (using the VXLAN VNI to provide both Layer 2 and Layer 3 segmentation). Micro-segmentation logically separates user or device groups within a VN, by enforcing source to destination access control permissions, such as by using access control lists (ACLs). A scalable group is a logical object identifier assigned to a group of users, devices, or things in the network fabric 420. It can be used as source and destination classifiers in Scalable Group ACLs (SGACLs). The SGT can be used to provide address-agnostic group-based policies.

In some embodiments, the fabric control plane node 410 may implement the Locator/Identifier Separation Protocol (LISP) to communicate with one another and with the management cloud 402. Thus, the control plane nodes may operate a host tracking database, a map server, and a map resolver. The host tracking database can track the endpoints 430 connected to the network fabric 420 and associate the endpoints to the fabric edge nodes 426, thereby decoupling an endpoint's identifier (e.g., IP or MAC address) from its location (e.g., closest router) in the network.

The physical layer 540 can comprise network infrastructure devices, such as switches and routers 410, 422, 424, and 426 and wireless elements 408 and 428 and network appliances, such as the network controller appliance(s) 404, and the AAA appliance(s) 406.

The shared services layer 550 can provide an interface to external network services, such as cloud services 552; Domain Name System (DNS), DHCP, IP Address Management (IPAM), and other network address management services 554; firewall services 556; Network as a Sensor (Naas)/Encrypted Threat Analytics (ETA) services; and Virtual Network Functions (VNFs) 560; among others. The management layer 502 and/or the controller layer 520 can share identity, policy, forwarding information, and so forth via the shared services layer 550 using APIs.

Figure 7:
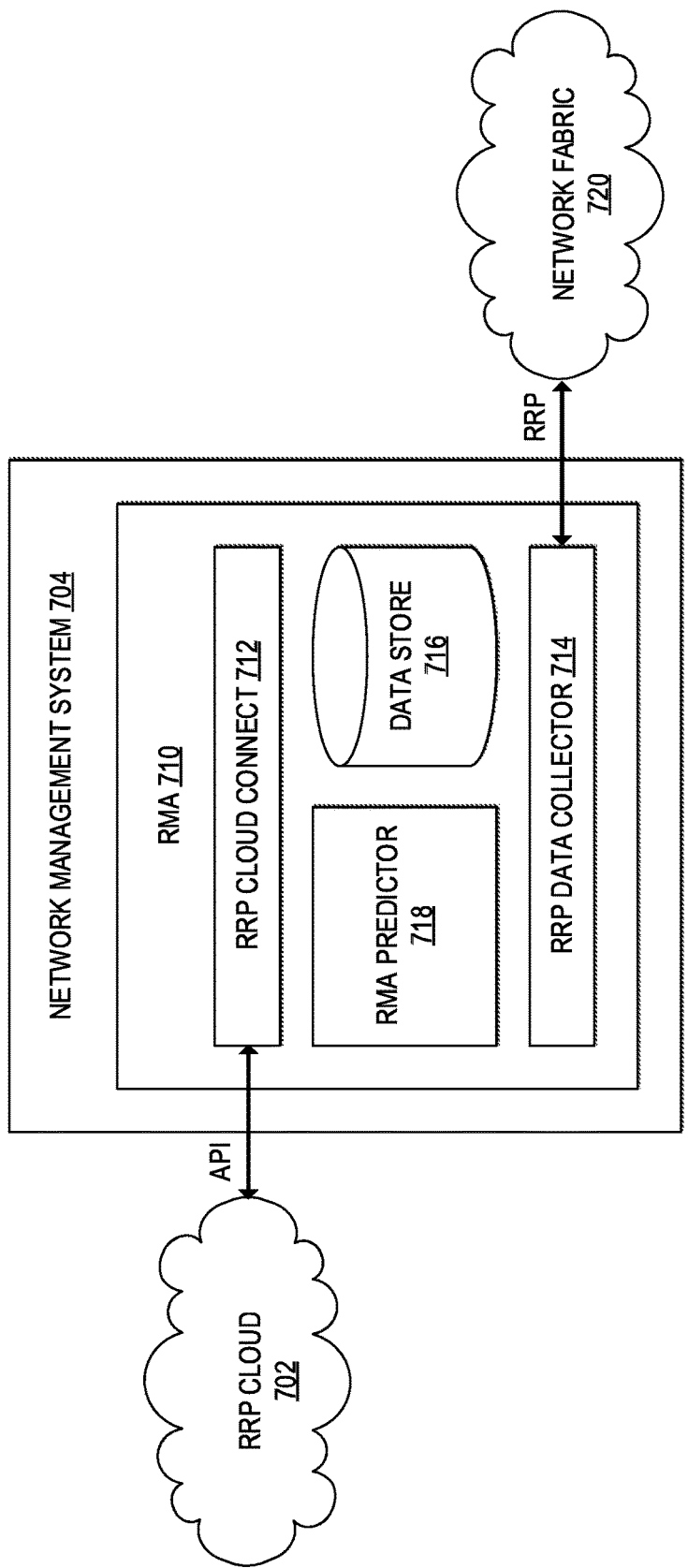
FIG. 7 illustrates an example of an application architecture for managing Return Merchandise Authorization (RMA) for a network device in accordance with an embodiment.

FIG. 7 illustrates an example of an application architecture 700 for automating a Return Merchandise Authorization (RMA) process. The application architecture 700 can include an RRP cloud 702, a network management system (e.g., the network management system implemented by the network controller appliance(s) 404), and a network fabric 720 (e.g., the network fabric 420). The RRP cloud 702 can operate as a service for providing RRP error metadata, such as a published error or diagnostic signature pack.

In this example, the network management system 704 includes an RMA application 710. The RMA application 710 can include an RRP cloud connect interface 712, an RRP data collector 714, a data store 716, and an RMA predictor 718. The RRP cloud connect interface 712 may be used to communicate with the RRP cloud 702 over an API (e.g., REST, SOAP, SOA, gRPC, etc.), a network protocol (e.g., NETCONF), or other suitable communication channel.

The RRP data collector 714 may be used for aggregating RRP frames from network devices in the network fabric 720 and other RMA data. In some embodiments, the RRP data collector 714 may be capable of probing the network devices in the network fabric 720 to gather failure event data and/or silicon aging factors. The RRP data collector 714 may store the collected data in the data store 716.

The RMA predictor 718 can build an event/crash pattern database and use predictive analysis for determining whether a network device should be marked for RMA. For example, the RMA predictor may utilize the network data platform 525 for such analysis.

Figure 8A:
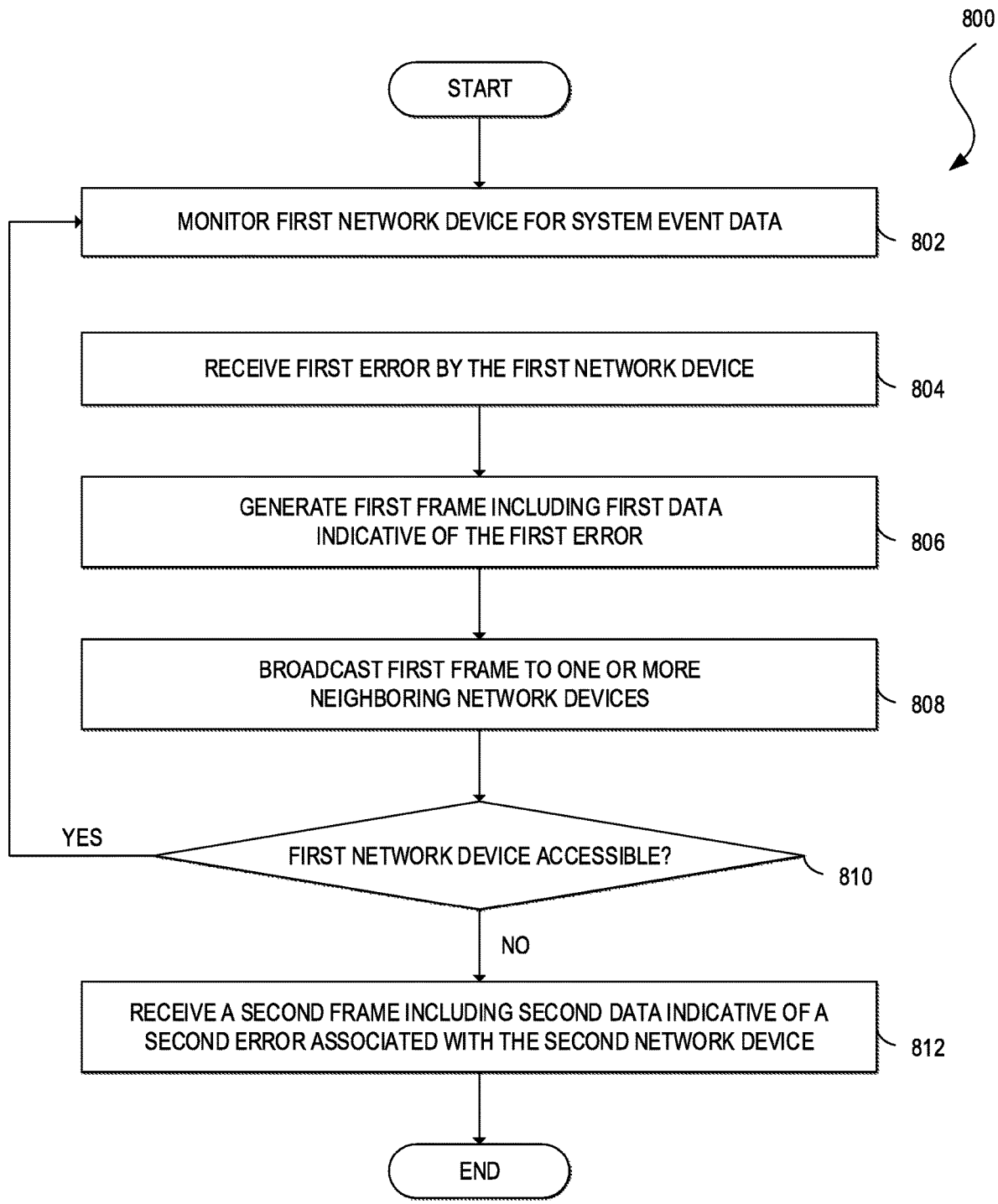
FIG. 8A illustrates an example of an RRP process in accordance with an embodiment.

FIG. 8A illustrates an example of a process 800 for showing some aspects of Return and Replacement Protocol (RRP). One of ordinary skill will understood that, for any processes discussed herein, there can be additional, fewer, or alternative steps performed in similar or alternative orders, or in parallel, within the scope of the various embodiments unless otherwise stated. The process 800 may be performed by a network device, such as the fabric control node(s) 410, the fabric border nodes 422, the fabric intermediate nodes 424, the fabric edge nodes 426, the wireless access points 428, or other switch, router, or other network appliance.

The process 800 may begin at step 802 in which a first network device can monitor system event data at a kernel level of its operating system (e.g., Cisco IOS®, Cisco IOS® XE, Cisco IOS® XR, Cisco® NX-OS, Cisco® Catalyst OS (CatOS), etc.). For example, the operating system may include an event messaging system that can generate messages for various conditions of the network device, such as over- and under-voltage, temperature events, fan events, events from the BIOS, memory errors, CPU errors, and so forth. An example format of a system message is:
% FACILITY-SUBFACILITY-SEVERITY-MNEMONIC: Message-text.

The fields of this example of a system message are discussed in greater detail above with respect to Table 1.

The process 800 can proceed to step 804 in which the first network device can receive a first error. In some embodiments, the first network device can generate a hash code from a received system event message. Then, the first network device can compare the hash code to a published error or diagnostic signature pack to determine whether the system event indicates that the network device may have to be designated for RMA, such as if the system event maps to an error known to have previously caused network devices to be designated for RMA. In some embodiments, the first network device may evaluate whether the system event maps to a severity level satisfying a criticality threshold. For example, events may be associated with an error severity level, such as shown in Table 2. An event that is designated as an error, a level three event, an error condition, and so forth, may satisfy the criticality threshold.

The process 800 can continue to step 806 in which the first network device generates one or more first frames (e.g., RRP frames) including first data indicative of the first error. An example of the format for an RRP frame is set forth in the discussion above with respect to FIGS. 2A-2C. In some embodiments, the first network device may include an error signature or hash code corresponding to the first error for inclusion in the one or more first frames.

At step 808, the first network device can broadcast the one or more first frames to one or more neighboring network devices, such as by RRP discussed above with respect to FIGS. 2A-2C. The process 800 may proceed to decision block 810 in which it can be determined whether the first network device is accessible and responsive, such as by attempting to interface with the network device via a console port or management port (e.g., via Telnet, Secure Shell (SSH), Hypertext Transfer Protocol (HTTP), HTTP-Secure (HTTPS), etc.). If the network device is accessible, the process 800 may return to step 802 in which the network device may continue monitoring for system event data.

If the network device is inaccessible, such as if the network device is in an endless reboot loop or otherwise unresponsive, the process 800 may conclude with step 812 in which a second network device from among the one or more neighboring devices of the first network device is accessed to retrieve the first data indicative of the first error (e.g., such as by using a command line interface (CLI) like the CLI set forth in Table 6). In some embodiments, this can be accomplished by locally accessing the second network device by its console port or remotely accessing the second network device by its management port (including by a network management system, such as the network management system 404 or 704).

The process 800 shows the operation of RRP by the first network device as a transmitting device but the first network device can additionally or alternatively operate as a receiving device. For example, the first network device can receive one or more second frames (e.g., RRP frames) including second data indicative of a second error event associated with the second network device. If the second network device becomes inaccessible or unresponsive, its crash/error data can be retrieved from the first network device.

A boot sequence for a network device can include a power-on self test (POST) (e.g., from read-only memory (ROM) of the network device), loading of a bootstrap (e.g., from random-access memory (RAM) of the network device), loading of a network device operating system (e.g., Cisco IOS®) (e.g., from Flash memory of the network device, a remote Trivial File Transfer Protocol (TFTP) server, ROM of the network device, etc.), and loading of a configuration file or execution of a setup mode (e.g., from non-volatile random-access memory (NVRAM) of the network device, a remote TFTP server, a console, etc.). In some embodiments, a network device may execute the process 800 before the loading of the bootstrap, as part of the bootstrap, after loading of the bootstrap, and/or before loading of the network device operating system. Additionally or alternatively, an RRP process may be given higher or highest priority (at least at boot-up) to ensure that the network device transmits any RRP frames that have not yet been transmitted and that the network device does not execute other processes that may be causing an endless reboot loop. In this manner, the network device may be capable of transmitting RRP frames even when the network device is continuously crashing and/or rebooting.

Figure 8B:
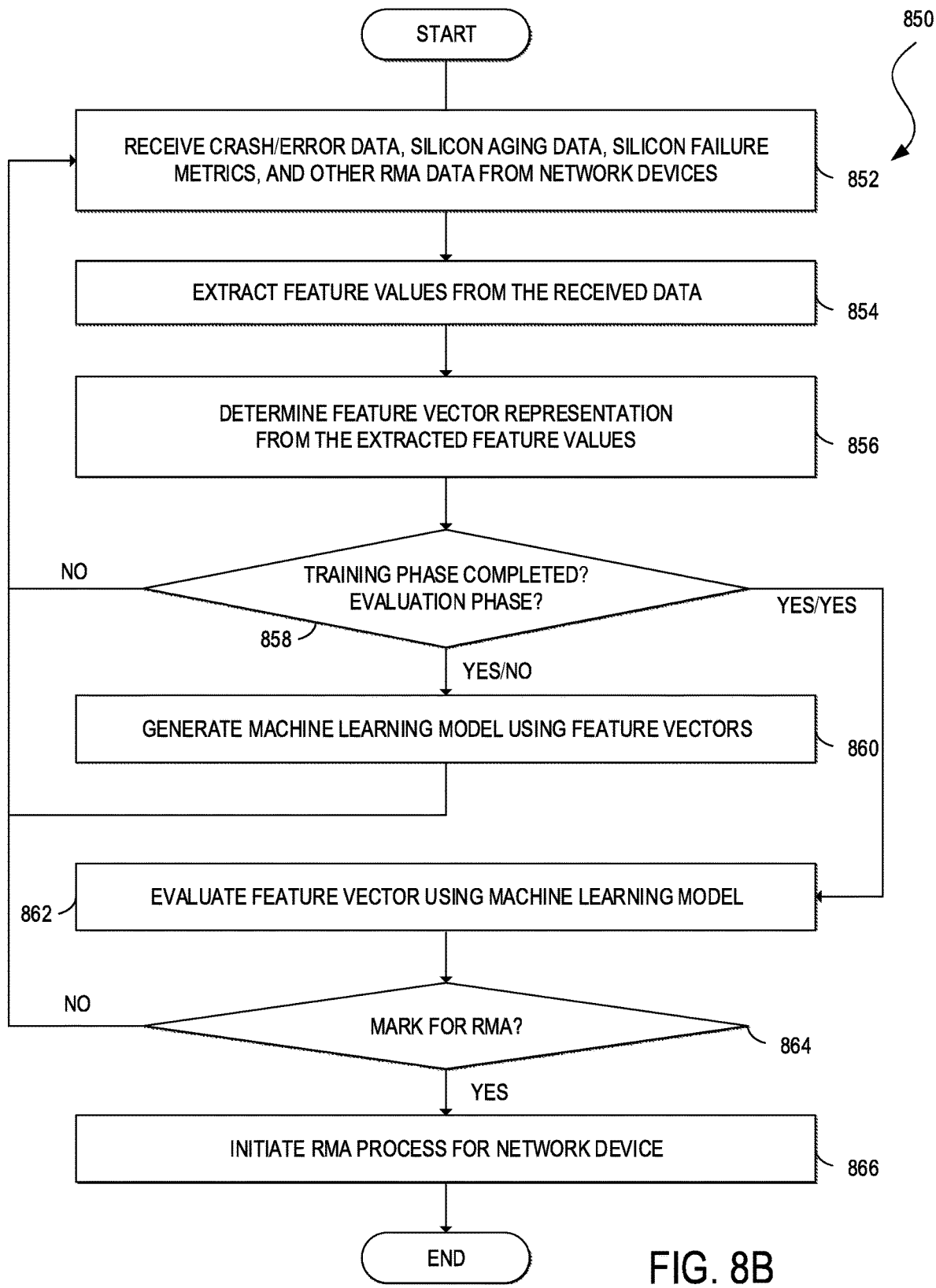
FIG. 8B illustrates an example of a process for managing Return Merchandise Authorization (RMA) for a network device in accordance with an embodiment.

FIG. 8B illustrates an example of a process 850 for automating Return Merchandise Authorization (RMA) for a network device. In some embodiments, the process 800 may be performed by a network controller (e.g., the network controller(s) 404), a network management system (e.g., the network management system 704), an RMA application (e.g., the RMA application 710, a network device (e.g., the fabric control node(s) 410, the fabric border nodes 422, the fabric intermediate nodes 424, the fabric edge nodes 426, the wireless access points 428, etc.), a network (e.g., the enterprise network 400), or other suitable system (collectively, the network). In some embodiments, the network can utilize machine learning classification for determining whether to automatically initiate an RMA process for a faulting network device.

Classification is a process for determining a label (also sometimes referred to as a class, category, outcome, dependent variable, and so forth) for an unlabeled data point given a set of training data points and associated training labels. Machine learning classification can sometimes include two phases, a training phase in which a machine learning model (e.g., a classifier) is constructed from the training data points and their class labels, and an evaluation phase in which the machine learning model is utilized to determine a label for a new, unlabeled data point. Some example approaches for machine learning classification include probabilistic classifiers, nearest neighbors classifiers, support vector machines (SVMs), decision trees/random forests, boosting classifiers, and neural networks, among others.

Probabilistic classifiers can use statistical inference to find the best class for a given data point. Probabilistic classifiers can also provide a corresponding probability of the data point being a member of each of the possible classes. Example approaches of probabilistic classifiers include Naive Bayes classifiers and logistic regression, among others.

Naive Bayes classifiers comprise a set of classifiers based on Bayes' theorem of conditional probability or the probability of a class 'c' given a set of feature values 'x':

$$P(c|x) = \frac{P(x|c)P(c)}{P(x)}, \quad \text{(Equation 2)}$$

where P(c|x) can represent the posterior probability of the class 'c' or the probability of the 'c' class given 'x' feature values, P(x|c) can represent the likelihood or the probability of 'x' feature values given the class 'c', P(c) can represent the prior probability of 'c' or the probability of class 'c' in the training data set, and P(x) can represent the prior probability of the 'x' feature values in the training data set. These classifiers may be characterized as naive because they assume that each feature is independent from one another for simplifying the calculation of P(x|c). The naive Bayes probability model can be combined with a decision rule for classification, such as a Maximum A Posteriori (MAP) rule, that classifies a data point based on a class having the greatest probability among the possible classes. Different types of naive Bayes classifiers may use different assumptions regarding the distribution of P(x|c), such as a Gaussian distribution, a multinomial distribution, or a Bernouli distribution, among others Logistic regression can be used to predict the probability of a categorical dependent variable (e.g., class) based on one or more observed independent variables (e.g., feature values). Logistic regression may rely on a logistic function (e.g., sigmoid function, s-curve, etc.) to model the relationship between the categorical dependent variable and independent variables. In particular, logistic regression can model the log odds of 'p' or logit of 'p' as a linear combination of the independent variables:

$$logit(p) = \log\left(\frac{p}{1-p}\right) = \beta_0 + \beta_1 x_1 + \ldots + \beta_n x_n, \quad \text{(Equation 3)}$$

where p/(1−p) can represent the odds of the occurrence of an event, $\beta_0 \ldots \beta_n$ represent coefficients of the logit function, and $x_1 \ldots x_n$ can represent the independent variables. Logistic regression can involve finding the values of the coefficients β that best fits the training data, such as by using maximum likelihood estimation (MLE). Probability can be derived from:

$$p = \frac{e^{logit}}{1 + e^{logit}} = \frac{1}{1 + e^{-logit}} \quad \text{(Equation 4)}$$

Logistic regression models can be binomial (e.g., zero or one), multinomial (e.g., three or more unordered classes), or ordinal (e.g., three or more ordered classes).

A graphical model is a probabilistic model in which a graph can denote the conditional independence structure between random variables. Graphical models can provide a way to visualize the structure of a probabilistic model and to construct new models. In a probabilistic graphical model, each node can represent a random variable, and each edge can represent a probabilistic relationship between variables. The graph can reflect the way in which the joint distribution over all of the random variables can be decomposed into a product of factors, each depending only on a subset of the variables.

In a nearest neighbor classifier, the top nearest neighbors to an unlabeled data point can be identified from the training data. The class label with the largest presence among the nearest neighbors can be designated as the class label for the unlabeled data point. In some embodiments, training data points may be aggregated for improving classification. For example, small clusters can be determined from the instances of each class, and the centroid of each cluster may be used as a new instance. Such an approach may be more efficient and more robust to noise. Other variations may use different similarity (or distance) functions, such as the Minkowski distance or the Mahalanobois distance.

The Minkowski distance may be appropriate where feature vectors are independent and each feature vector is of equal importance. For example, if D is the distance between feature vectors v and w, and $f_i(x)$ is the number of features in a bin i of x, the Minkowski distance can be defined as:

$$D(v,w) = (\Sigma_i |f_i(v) - f_i(w)|^p)^{1/p}, \quad \text{(Equation 5)}$$

where p=1 is the $L_1$ distance (also sometimes called the Manhattan distance), p=2 is the $L_2$ distance (also known as the Euclidean distance), and p=∞ is the L∞ (also called the Chebyshev distance).

The Mahalanobis distance may be appropriate when each dimension of the feature vector is dependent of each other and is of different importance. The Mahalanobis distance can be defined as:

$$D(v,w) = \sqrt{(\mathcal{F}_v - \mathcal{F}_w)^T C^{-1} (\mathcal{F}_v - \mathcal{F}_w)}, \quad \text{(Equation 6)}$$

where C is the covariance matrix of the feature vectors v and w, $\mathcal{F}_v$ and $\mathcal{F}_w$ are vectors that list all the feature values in $f_i(v)$ and $f_i(w)$.

Other similarity (or distance) measures that can also be used include the Quadratic Form distance, the Kullback-Leibler divergence, the Jeffrey divergence, the Hausdorff distance, the Mallows distance, the earth mover's distance, the integrated region matching distance, or variations thereof. Some embodiments may also use various indexing structures or techniques for efficiently searching the feature set space, including multi-dimensional hashing, which maps features into fix-sized bins or buckets based on some function applied to each feature; locality sensitive hashing, which uses unions of independently computed hashing functions to index features; or multi-dimensional search trees such as k-d trees, which divide the multi-dimensional feature space along alternating axis-aligned hyper-planes to maximize search tree balance; among other approaches.

Support vector machines may be constructed by finding the linear conditions (referred to as a hyper-plane, etc.) that best separate classes from one other. Generating an SVM can involve plotting data points in n-dimensional space (where n is the number of features of the data points), identifying the hyper-planes that differentiate classes, and maximizing the distances (referred to as the margin) between the data points of the classes. In other words, an SVM classifier may identify the maximum margin hyper-plane from the training data set.

A decision tree may be created from a data set in which each node of the tree can correspond to one or more features, and a branch or edge from the node to a child node can correspond to the possible values of the feature(s). Each leaf can represent a class label whose feature values satisfy the specified ranges of the path from the root of the tree to the leaf. The partitioning at each level of the tree can be based on a split criterion, such as a condition or rule based on one or more features. Decision trees try to recursively split the training data so as to maximize the discrimination among different classes over different nodes of the tree. Decision tree algorithms may differ on how to select the splitting features and how to prune the tree when it becomes too large. Some examples of decision trees include Iterative Dichotomiser 3 (ID3), C4.5, Classification and Regression Tree (CART), and Chi-squared Automatic Interaction Detector (CHAID), among others.

Random forests may rely on a combination of decision trees in which each tree may depend on the values of a random vector sampled independently and with the same distribution for all trees in the forest. A random forest can be trained for some number of trees t by sampling n cases of the training data at random with replacement to create a subset of the training data. At each node, a number m of the features can be selected at random from the set of all features. The feature that provides the best split can be used to do a binary split on that node. At the next node, another number m of the features can be selected at random and the process can be repeated.

Boosting classifiers attempt to identify a highly accurate hypothesis (e.g., low error rate) from a combination of many "weak" hypotheses (e.g., substantial error rate). Given a data set comprising data points within a class and not within the class and weights based on the difficulty of classifying a data point and a weak set of classifiers, boosting can generate and call a new weak classifier in each of a series of rounds. For each call, the distribution of weights may be updated to reflect the importance of the data points in the data set for the classification. On each round, the weights of each incorrectly classified data point can be increased, and the weights of each correctly classified data point can be decreased so the new classifier can focus on the difficult data points (i.e., those data points that have not been correctly classified). Some examples of boosting methods include Adaptive Boosting (AdaBoost), Gradient Tree Boosting, and XGBoost, among others.

Neural networks are inspired by biological neural networks and comprise an interconnected group of functions or classifiers that process information using a connectionist approach. The basic units of a neural network can be neurons (or perceptrons) that are connected to one another based on weights representing the strength of the connection between the units. A neural network can take input data from a set of dedicated input neurons and deliver its output to a set of dedicated output neurons. However, a neuron can generally operate as both an input unit and/or an output unit. For classification, a neural network can be characterized by the model of the neuron (e.g., binary threshold unit, linear threshold unit, linear unit, sigmoidal unit, distance unit, radial basis unit, polynomial unit, Gaussian unit, etc.), its net value function (e.g., the unit's parameters or weights to summarize input data), and its activation function (e.g., how the unit may transform the net value into an output value); the architecture or the topology connecting the neural network (e.g., single-layer network, multi-layer network, network with feedback, etc.); the data encoding policy defining how input data (e.g., feature vector) or class labels are represented in the network, and the training algorithm used to determine the optimal set of weights associated with each unit (e.g., Hebbian rule, delta rule, etc.). Examples of neural networks can include the multilayer neural network, the auto associative neural network, the probabilistic decision-based neural network (PDBNN), and the sparse network of winnows (SNOW), among others.

Turning back to FIG. 8B, the process 850 may include a training phase (e.g., steps 852-860) in which the network collects data points for generating a machine model for determining whether to initiate RMA for a network device and an evaluation phase (e.g., steps 852-856 and 862-866) in which the network applies a data point to the machine model to determine whether to initiate RMA for a network device. The process 850 may begin with step 852 in which the network can receive crash/error data, silicon aging data (e.g., such as set forth in Table 4), silicon failure metrics (e.g., such as set forth in Table 5), and other relevant information (e.g., syslog, SNMP, NetFlow, SPAN, streaming telemetry, etc.) from network devices (e.g., the fabric control node(s) 410, the fabric border nodes 422, the fabric intermediate nodes 424, the fabric edge nodes 426, the wireless access points 428, or other switch, router, or other network appliance, etc.) of a network (e.g., the enterprise network 400).

For example, a network controller, a network management system, an RMA application, or other suitable system can periodically retrieve the relevant RMA data and/or the network devices may periodically transmit the relevant RMA data via NETCONF/YANG (e.g., the YANG model 328), an RRP MIB (e.g., the RRP MIB 330), or other API or interface.

After collection of the crash/error data, silicon aging data, silicon failure metrics, and other information pertaining to whether to initiate RMA for a network device, the process 850 may continue on to step 854, in which the network can extract feature values from the data collected for each network device. For example, features of the crash/error data can include a device identifier, process identifier, process details, crash code, crash message, timestamp, occurrence, priority, neighbor device identifier, and so forth, on a per event basis, or the set of device identifiers, process identifiers, process details, crash codes, crash messages, timestamps, number of occurrences, event priorities, and so forth, over the last hour, last day, last month, the life of the network device, or other duration.

Feature values of the silicon aging factors can include static values previously determined from testing of a class of network devices and/or screening of a specific network device (e.g., HTOL testing/screening, voltage stress testing/screening, HAST, temperature cycling, temperature and mechanical shock testing/screening, environmental stress testing/screening, electromigration testing/screening, Mask Fab comparisons, print checks, defect density monitoring, C-V stress testing/screening, wafer fab device stress testing/screening, oxide characterization testing/screening, etc.). Feature values of the silicon aging factors can also include dynamic values that may be relevant to aging of silicon, such as sensor readings associated with oxide defects (e.g., temperature, voltage, etc.), silicon defects (e.g., temperature, voltage, etc.), corrosion (e.g., temperature, humidity, etc.), electromigration (e.g., temperature), mask defects/photoresist defects (e.g., temperature, voltage, etc.), contamination (e.g., stress), charge injection (e.g., temperature, oxide characterization, etc.), and so forth.

Similarly, feature values of silicon failure metrics can include static values previously determined for a class of network devices, such as Failure Rate (k), Failure in Time (FIT) metrics, Total Device Hours (TDH) metrics, Mean Time to Failure (MTTF) metrics, Confidence Level or Limit (AL) metrics, Acceleration Factor (AF) metrics, and so forth (collectively, silicon failure data). Feature values of silicon failure metrics can also include dynamic values that may be relevant to these silicon failure metrics for a specific network device, such as the length of operation of the network device.

Other feature values can include data extracted from syslog, SNMP, NetFlow, SPAN, streaming telemetry, and other data pertaining to RMA. Feature values may be binary, numeric, categorical, character-based, or other primitive data types. Feature values may also be composites of primitive data types or abstract data types. Feature values may be structured or unstructured.

At step 856, the network can determine a feature vector representation from the extracted features as data points for further processing. Each data point may correspond to an individual crash/error event or a collection of crash/error events for an individual network device. Although the process 850 refers to a vector representation for features, it will be appreciated that other representations may be equivalent to vectors (e.g., lists, arrays, matrices, etc.) and/or other representations (e.g., trees, hashes, graphs, histograms, etc.)

may be suitable for representing features, and these other representations can be utilized in various embodiments.

In some embodiments, the network may utilize early fusion for representing the feature vectors. For example, individual feature vectors for multiple domains (e.g., the crash/error data domain, silicon aging data domain, silicon failure metric domain, etc.) can be extracted for a data point, and the individual feature vectors can be combined into a single or monolithic feature vector representing the data points across the multiple feature domains.

In some embodiments, the network may alternatively or additionally implement late fusion for representing feature vectors. For example, after individual feature values have been extracted during step 854, the network can assemble individual feature vectors for multiple domains (e.g., the crash/error data domain, silicon aging data domain, silicon failure metric domain, etc.). Then, the network may utilize domain-specific learners for analyzing the domain-specific feature vectors. The network can then combine the results of each domain-specific learner to represent the late fusion feature vector.

In some embodiments, the network may perform various pre-processing tasks to prepare the individual feature vectors for fusion (early fusion or late fusion). These pre-processing tasks may include rescaling (e.g., normalization, standardization, min-max scaling, etc.), non-linear transformations (e.g., mapping feature values to a uniform distribution, Gaussian distribution, Poisson distribution, etc.) category encoding (e.g., converting a text feature value to an ordinal), variable discretization (e.g., k-bins discretization, feature binarization, etc.), missing values and outliers processing (e.g., filling in missing values, substituting outlying feature values, removing data points that have missing values or that are outliers, etc.), and dimensionality reduction, among others.

After the network determines the feature vector representation of a data point, the process 850 may proceed to a decision block 858. If the training phase has not been completed, such as if the number of instances when a network device was actually designated for RMA or the total number of data points is below a threshold, or a specified duration has not yet elapsed, the process 850 may return to step 852 and the network may continue collecting data points for training a machine learning model for determining whether to initiate RMA for a network device.

If the training phase has been completed but the evaluation phase has not yet begun, the process 850 may proceed to step 860 in which the network generates one or more machine learning classifiers from the data points collected during the training phase. The machine learning classifier(s) may be generated from the feature vectors captured during the training phase using one or more of the techniques discussed above (e.g., Naive Bayes, logistic regression, nearest neighbors classifier, support vector machine, decision tree/random forest, boosting, or neural network classifier, or other suitable machine learning classifier). The output classes of the machine learning model(s) may be binary (e.g., whether or not to designate a network device for RMA), multi-class according to error type (e.g., class=0 corresponding to not designated for RMA, class=1 corresponding to designated for RMA, class=2 corresponding to error type 2, etc.), multi-class according to time (e.g., class=0 corresponding to not designated for RMA, class=1 corresponding to immediate designation for RMA, class=2 corresponding to expected to be designated for RMA within time t1, etc.).

If the training phase has been completed and the evaluation phase has begun, the process 850 may continue to step 862 in which the network applies the feature vector representation to the machine learning classifier(s) generated at step 860 to determine whether to initiate RMA for a network device represented by the feature vector at decision block 864. If the machine learning classifier indicates the network device is an instance of a class of network devices designated for RMA, the process 850 may continue to step 866 in which the network initiates the network device for RMA. If the machine learning model indicates that the network device is not an instance of a class of network devices designated for RMA, the process 850 may return to step 852, and the network can continue collecting RMA data.

FIG. 9 illustrates an example of a network device 900 (e.g., switch, router, network appliance, etc.). The network device 900 can include a master central processing unit (CPU) 902, interfaces 904, and a bus 906 (e.g., a PCI bus). When acting under the control of appropriate software or firmware, the CPU 902 can be responsible for executing packet management, error detection, and/or routing functions. The CPU 902 preferably accomplishes all these functions under the control of software including an operating system and any appropriate applications software. The CPU 902 may include one or more processors 908 such as a processor from the Motorola family of microprocessors or the MIPS family of microprocessors. In an alternative embodiment, the processor 908 can be specially designed hardware for controlling the operations of the network device 900. In an embodiment, a memory 910 (such as non-volatile RAM and/or ROM) can also form part of the CPU 902. However, there are many different ways in which memory could be coupled to the system.

The interfaces 904 can be provided as interface cards (sometimes referred to as line cards). The interfaces 904 can control the sending and receiving of data packets over the network and sometimes support other peripherals used with the network device 900. Among the interfaces that may be provided are Ethernet interfaces, frame relay interfaces, cable interfaces, DSL interfaces, token ring interfaces, and the like. In addition, various very high-speed interfaces may be provided such as a fast token ring interface, wireless interface, Ethernet interface, Gigabit Ethernet interface, Asynchronous Transfer Mode (ATM) interface, High-Speed Serial Interface (HSSI), Packet Over SONET (POS) interface, Fiber Distributed Data Interface (FDDI), and the like. The interfaces 904 may include ports appropriate for communication with the appropriate media. In some cases, the interfaces 904 may also include an independent processor and, in some instances, volatile RAM. The independent processors may control communication intensive tasks such as packet switching, media control, and management. By providing separate processors for the communication intensive tasks, the interfaces 904 may allow the CPU 902 to efficiently perform routing computations, network diagnostics, security functions, and so forth.

Although the system shown in FIG. 9 is an example of a network device of an embodiment, it is by no means the only network device architecture on which the subject technology can be implemented. For example, an architecture having a single processor that can handle communications as well as routing computations and other network functions, can also be used. Further, other types of interfaces and media may also be used with the network device 900.

Regardless of the network device's configuration, it may employ one or more memories or memory modules (including the memory 910) configured to store program instructions for general-purpose network operations and mechanisms for roaming, route optimization, and routing functions described herein. The program instructions may control the operation of an operating system and/or one or more applications. The memory or memories may also be configured to store tables such as mobility binding, registration, and association tables.

Figure 10A:
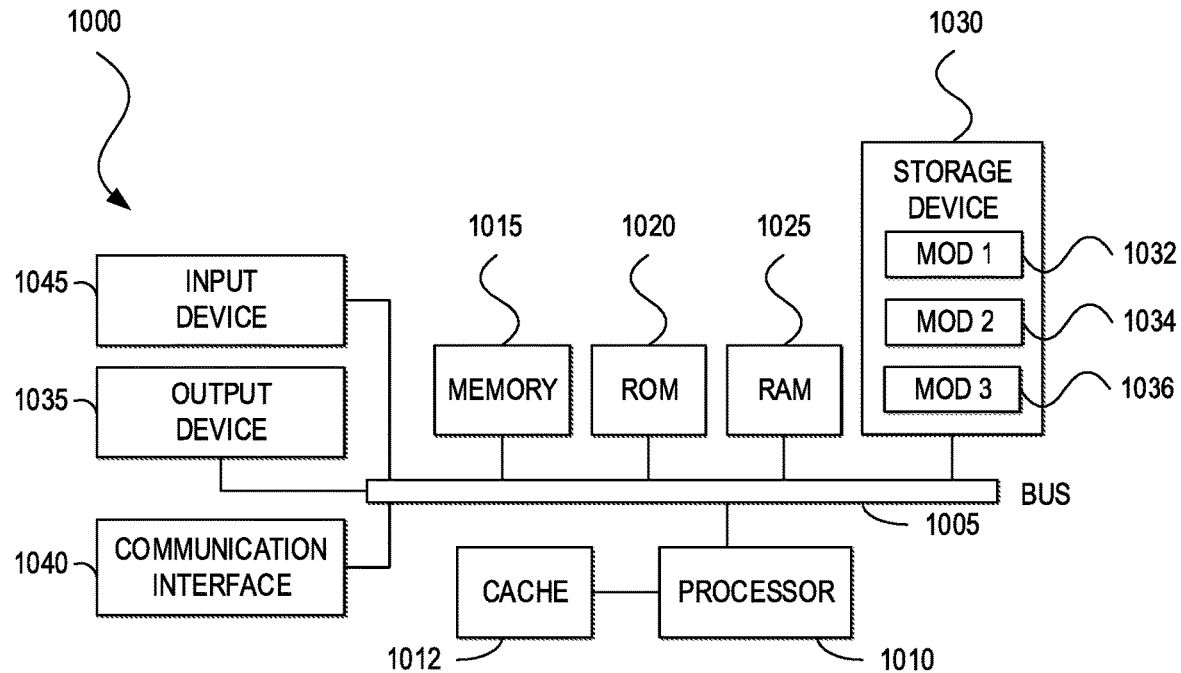
FIGS. 10A and 10B illustrate examples of systems in accordance with some embodiments.
Figure 10B:
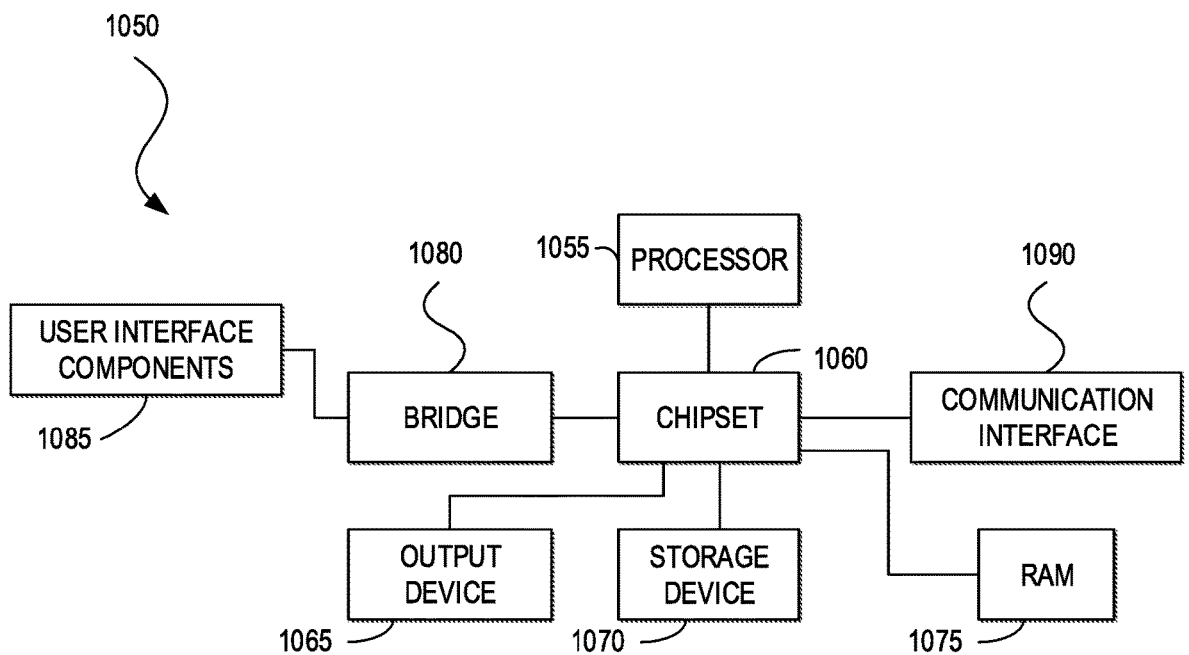

FIG. 10A and FIG. 10B illustrate systems in accordance with various embodiments. The more appropriate system will be apparent to those of ordinary skill in the art when practicing the various embodiments. Persons of ordinary skill in the art will also readily appreciate that other systems are possible.

FIG. 10A illustrates an example of a bus computing system 1000 wherein the components of the system are in electrical communication with each other using a bus 1005. The computing system 1000 can include a processing unit (CPU or processor) 1010 and a system bus 1005 that may couple various system components including the system memory 1015, such as read only memory (ROM) 1020 and random access memory (RAM) 1025, to the processor 1010. The computing system 1000 can include a cache 1012 of high-speed memory connected directly with, in close proximity to, or integrated as part of the processor 1010. The computing system 1000 can copy data from the memory 1015, ROM 1020, RAM 1025, and/or storage device 1030 to the cache 1012 for quick access by the processor 1010. In this way, the cache 1012 can provide a performance boost that avoids processor delays while waiting for data. These and other modules can control the processor 1010 to perform various actions. Other system memory 1015 may be available for use as well. The memory 1015 can include multiple different types of memory with different performance characteristics. The processor 1010 can include any general purpose processor and a hardware module or software module, such as module 1 1032, module 2 1034, and module 3 1036 stored in the storage device 1030, configured to control the processor 1010 as well as a special-purpose processor where software instructions are incorporated into the actual processor design. The processor 1010 may essentially be a completely self-contained computing system, containing multiple cores or processors, a bus, memory controller, cache, etc. A multi-core processor may be symmetric or asymmetric.

To enable user interaction with the computing system 1000, an input device 1045 can represent any number of input mechanisms, such as a microphone for speech, a touch-protected screen for gesture or graphical input, keyboard, mouse, motion input, speech and so forth. An output device 1035 can also be one or more of a number of output mechanisms known to those of skill in the art. In some instances, multimodal systems can enable a user to provide multiple types of input to communicate with the computing system 1000. The communications interface 1040 can govern and manage the user input and system output. There may be no restriction on operating on any particular hardware arrangement and therefore the basic features here may easily be substituted for improved hardware or firmware arrangements as they are developed.

The storage device 1030 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 1030 can include the software modules 1032, 1034, 1036 for controlling the processor 1010. Other hardware or software modules are contemplated. The storage device 1030 can be connected to the system bus 1005. In some embodiments, a hardware module that performs a particular function can include a software component stored in a computer-readable medium in connection with the necessary hardware components, such as the processor 1010, bus 1005, output device 1035, and so forth, to carry out the function.

FIG. 10B illustrates an example architecture for a chipset computing system 1050 that can be used in accordance with an embodiment. The computing system 1050 can include a processor 1055, representative of any number of physically and/or logically distinct resources capable of executing software, firmware, and hardware configured to perform identified computations. The processor 1055 can communicate with a chipset 1060 that can control input to and output from the processor 1055. In this example, the chipset 1060 can output information to an output device 1065, such as a display, and can read and write information to storage device 1070, which can include magnetic media, solid state media, and other suitable storage media. The chipset 1060 can also read data from and write data to RAM 1075. A bridge 1080 for interfacing with a variety of user interface components 1085 can be provided for interfacing with the chipset 1060. The user interface components 1085 can include a keyboard, a microphone, touch detection and processing circuitry, a pointing device, such as a mouse, and so on. Inputs to the computing system 1050 can come from any of a variety of sources, machine generated and/or human generated.

The chipset 1060 can also interface with one or more communication interfaces 1090 that can have different physical interfaces. The communication interfaces 1090 can include interfaces for wired and wireless LANs, for broadband wireless networks, as well as personal area networks. Some applications of the methods for generating, displaying, and using the technology disclosed herein can include receiving ordered datasets over the physical interface or be generated by the machine itself by the processor 1055 analyzing data stored in the storage device 1070 or the RAM 1075. Further, the computing system 1050 can receive inputs from a user via the user interface components 1085 and execute appropriate functions, such as browsing functions by interpreting these inputs using the processor 1055.

It will be appreciated that computing systems 1000 and 1050 can have more than one processor 1010 and 1055, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer-implemented method, comprising:
  receiving, by a first network device, a first error associated with the first network device;
  generating, by the first network device, one or more first frames including first data indicative of the first error;
  broadcasting, by the first network device, the one or more first frames to one or more neighboring network devices;
  determining, after the broadcasting, that the first network device is unresponsive;
  presenting the first data in response to a request to a second network device among the one or more neighboring network devices;
  extracting one or more feature values from the one or more first frames, the one or more feature values including at least one of silicon aging data or silicon failure data of the first network device; and
  determining a feature vector representation based on the one or more feature values.

2. The computer-implemented method of claim 1, further comprising:
  generating at least one of a naive Bayes, logistic regression, nearest neighbors, support vector machine, boosting, or neural network classifier based at least in part on the feature vector representation.

3. The computer-implemented method of claim 1, further comprising:
  applying the feature vector representation to one or more machine learning classifiers; and
  in response to the one or more machine learning classifiers indicating that the first network device is an instance of a class of network devices designated for Return Merchandise Authorization (RMA), initiating an RMA process for the first network device.

4. The computer-implemented method of claim 1, further comprising:
  applying the feature vector representation to one or more machine learning models; and
  providing a prediction of a time that the first network device is expected to be designated for RMA to an instance of a class of network devices designated for RMA.

5. The computer-implemented method of claim 1, further comprising:
  receiving, by a network management system, the silicon aging data of the first network device; and
  determining, by the network management system, a silicon failure metric of the first network device based at least in part on the silicon aging data.

6. The computer-implemented method of claim 1, further comprising:
  configuring, by a network management system, an interval at which a plurality of network devices transmit frames that include device error data to neighboring network devices.

7. The computer-implemented method of claim 1, wherein the first frame is broadcast prior to loading of an operating system of the first network device.

8. The computer-implemented method of claim 1, wherein the first frame is broadcast by a process given a highest process priority in the first network device.

9. The computer-implemented method of claim 1, further comprising:
  receiving, by the first network device from the second network device, one or more second frames including second data indicative of a second error associated with the second network device; and
  presenting the second data in response to a request to the first network device.

10. A system, comprising:
  one or more processors; and
  memory including instructions that, when executed by the one or more processors, cause the system to:
    receive, by a first network device of the system, a first error associated with the first network device;
    generate, by the first network device, one or more first frames including first data indicative of the first error;
    broadcast, by the first network device, the one or more first frames to one or more neighboring network devices;
    determine, after the broadcast, that the first network device is unresponsive; and
    present the first data in response to a request to a second network device among the one or more neighboring network devices;

extract one or more feature values from the one or more first frames, the one or more feature values including at least one of silicon aging data or silicon failure data of the first network device; and determine a feature vector representation based on the one or more feature values.

11. The system of claim 10, wherein the instructions, when executed, further cause the system to:

generate at least one of a naive Bayes, logistic regression, nearest neighbors, support vector machine, boosting, or neural network classifier based at least in part on the feature vector representation.

12. The system of claim 10, wherein the instructions, when executed, further cause the system to:

apply the feature vector representation to one or more machine learning classifiers; and in response to the one or more machine learning classifiers indicating that the first network device is an instance of a class of network devices designated for Return Merchandise Authorization (RMA), initiate an RMA process for the first network device.

13. The system of claim 10, wherein the instructions, when executed, further cause the system to:

apply the feature vector representation to one or more machine learning models; and provide a prediction of a time that the first network device is expected to be designated for RMA to an instance of a class of network devices designated for RMA.

14. A non-transitory computer-readable storage medium including instructions that, upon being executed by one or more processors of a system, cause the system to perform operations comprising:

receive, by a first network device of the system, a first error associated with the first network device;

generate, by the first network device, one or more first frames including first data indicative of the first error;

broadcast, by the first network device, the one or more first frames to one or more neighboring network devices;

determine, after the broadcast, that the first network device is unresponsive;

present the first data in response to a request to a second network device among the one or more neighboring network devices;

extract one or more feature values from the first frame, the one or more feature values including at least one of silicon aging data or silicon failure data of the first network device; and determine a feature vector representation based on the one or more feature values.

15. The non-transitory computer-readable storage medium of claim 14, wherein the instructions, when executed, further cause the system to:

receive the silicon aging data of the first network device; and determine a silicon failure metric of the first network device based at least in part on the silicon aging data.

16. The non-transitory computer-readable storage medium of claim 14, wherein the instructions, when executed, further cause the system to:

configure an interval at which a plurality of network devices of the system transmit frames that include device error data to neighboring network devices of the system.

17. The non-transitory computer-readable storage medium of claim 14, wherein the first frame is broadcast prior to loading of an operating system of the first network device or the first frame is broadcast by a process given a highest process priority in the first network device.

* * * * *